(12) United States Patent
Hersh et al.

(10) Patent No.: US 7,755,518 B2
(45) Date of Patent: Jul. 13, 2010

(54) DYNAMIC AND PREDICTIVE INFORMATION SYSTEM AND METHOD FOR SHIPPING ASSETS AND TRANSPORT

(75) Inventors: Richard Hersh, Sunrise, FL (US); Michael J. Darden, Parkland, FL (US); John M. Urbanowicz, Winnetka, IL (US)

(73) Assignee: Nu-State Energy Holdings, Inc., Boca Raton, FL (US)

( * ) Notice: Subject to any disclaimer, the term of this patent is extended or adjusted under 35 U.S.C. 154(b) by 0 days.

(21) Appl. No.: 12/134,320

(22) Filed: Jun. 6, 2008

(65) Prior Publication Data

US 2008/0294491 A1 Nov. 27, 2008

Related U.S. Application Data

(62) Division of application No. 11/151,963, filed on Jun. 14, 2005, now Pat. No. 7,385,529.

(60) Provisional application No. 60/579,594, filed on Jun. 14, 2004.

(51) Int. Cl.
*G08G 1/123* (2006.01)
(52) U.S. Cl. .................. 340/988; 235/384; 235/385; 340/539.13; 705/8; 705/13; 705/28
(58) Field of Classification Search ............ 340/988, 340/439, 539.13, 426.19, 825.28; 705/1, 705/7, 8, 13, 9, 28; 701/200, 213, 300; 707/2; 700/216, 228; 235/384–385, 376
See application file for complete search history.

(56) References Cited

U.S. PATENT DOCUMENTS

| | | | |
|---|---|---|---|
| 5,485,369 A | 1/1996 | Nicholls et al. | 705/9 |
| 6,915,268 B2 | 7/2005 | Riggs et al. | 705/7 |
| 7,385,529 B2 * | 6/2008 | Hersh et al. | 340/988 |
| 2003/0036935 A1 | 2/2003 | Nel | 705/7 |
| 2003/0046133 A1 | 3/2003 | Morley et al. | 705/8 |
| 2003/0084125 A1 | 5/2003 | Nagda et al. | 709/219 |
| 2003/0144971 A1 | 7/2003 | Das et al. | 705/401 |

* cited by examiner

*Primary Examiner*—Brent Swarthout
(74) *Attorney, Agent, or Firm*—Robert C. Kain, Jr.

(57) ABSTRACT

The dynamic, predictive information system and method assigns shipping assets (drivers-tractors-trailers) from carriers to transport orders by shippers. Computer databases hold shipping asset data. Specific transport orders are electronically joined to specific driver-tractor-trailer combinations. A search and sort routine produces resulting records based upon proximity, trailer type, proximity of the joined driver-trailer combination, carrier service region and pick-up and delivery date constraints. The sort is by price or performance indicators which are pre-selected shipper ranges matched to historical shipping data from carriers. The system books the carrier, the driver-tractor-trailer combination and the shipper to transport order with an electronic communications phase. In a truck lane scenario, the system joins a specific driver and a specific tractor and a non-specific trailer to a specific transport order. GPS data and electronic shipping document data from PDAs with the drivers is logged into the system and is viewable by the participants.

37 Claims, 10 Drawing Sheets

DYNAMIC AND PREDICTIVE INFORMATION SYSTEM AND METHOD FOR SHIPPING ASSETS AND TRANSPORT

This is a divisional patent application based upon and claiming the benefit of patent application Ser. No. 11/151,963, filed Jun. 14, 2005, now U.S. Pat. No. 7,385,529, and the present invention is based upon and claims the benefit of provisional patent application No. 60/579,594, filed Jun. 14, 2004. The contents of Ser. No. 11/151,963 and 60/579,594 are incorporated herein by reference thereto.

The present invention relates to a dynamic and predictive information system and method for assigning shipping assets to goods subject to transport orders.

BACKGROUND OF THE INVENTION

In the transportation industry, vehicles transporting goods typically are identified as shipping assets. Shipping assets include truck drivers, tractors, trailers, containers, ships, railcars and airplanes. These shipping assets can sometimes be rearranged such that drivers operate different tractors and the driver-tractor combinations are sometimes coupled to different trailers at different times for different routes. In other instances, drivers are permanently assigned tractors. In some of these situations, the drivers may have a financial interest in the tractor which they use to haul loads. Further, in some instances, the drivers, tractors and trailers are permanently combined, linked, joined or associated with each other and are viewed as a singular shipping asset when special transport needs (for example, radioactive goods or large sized goods such as cranes) must be shipped from point to point. Special tractors must be coupled to special trailers to haul special goods. Sometimes, the drivers must have special skills. One type of permanently joined driver-tractor-trailer combination is called a "straight truck."

In any economic environment, it is necessary to efficiently transport and deliver goods from distribution centers, ports, warehouses and other locations to retail stores, other warehouses and further ports and airports. The timing and scheduling of shipping assets and the scheduling of those assets to match transport needs of customers is a challenge. About 94% of independent carriers (companies employing shipping assets) have less than 30 trucks. Approximately 20-25% of these assets, that is, a driver-tractor-trailer combination, travel over routes without a full load or are completely empty. The transit of empty trucks is not an efficient use of shipping assets. Further, the matching of a customer's need to ship goods from point to point within a designated time frame (both the pick-up day, time and location and the delivery day, time and location) with available shipping assets at the most reasonable price and/or performance (historical on-time delivery percentage and/or an absence of delivery/shipment problems) is a challenge. There is a need to provide and manage logistics for the transport of goods and the efficient use of shipping assets.

OBJECTS OF THE INVENTION

It is an object of the present invention to provide a dynamic, predictive information system and a method for assigning shipping assets to goods subject to transport orders.

It is a further object of the present invention to preemptively process and assign shipping assets, that is, drivers, tractors and trailers, available from a plurality of carriers to carry a load of goods subject to transport orders from a plurality of shippers.

It is a further object of the present invention to provide a method and a system which is transparent to the carrier and the shipper and the system administrator such that the carrier and shipper can identify the location of the goods subject to transport and view, on an electronic basis, electronic shipping documents showing classic events in the handling of the goods subject to the transport order.

It is another object of the present invention to provide a method for electronically assigning shipping assets and an information system therefor which is independent of any hardware operating the computer program or employing the electronic method.

It is an additional object of the present invention to provide just-in-time asset assignment of shipping assets to transport orders.

SUMMARY OF THE INVENTION

The dynamic and predictive information system and method assigns shipping assets (drivers, tractors and trailers) from a plurality of carriers to enable the shipment of goods subject to a plurality of transport orders from a plurality of shippers. A central computer maintains the database with data representing shipping assets wherein each carrier has at least one terminal from which respective shipping assets originate, respective service areas or regions, pricing schedules and, in some instances, lane routes (specially designated routes) which are often traveled by truck combinations of a particular carrier. The system and method electronically accepts a specific transport order and electronically joins a specific driver, a specific tractor, a compatible trailer for the goods subject to transport. A plurality of carriers participate in the assignment of assets. The system electronically searches the database and sorts the resulting records based upon close proximity of the trailer type to the ship from origin location, close proximity of the joined driver-tractor combination to the ship from origin, carrier service region encompassing the ship to destination, and pick-up and delivery date constraints. The sorted list, showing prices, is displayed to the shipper submitting the specific transport order. This display results in a posting of the assets to a specific transport order. In conjunction with an electronic communication between a selected carrier, typically selected by the shipper submitting the specific transport order, and the shipper with the transport order, the system books and electronically logs the carrier, the associated driver-tractor-trailer combination to transport order. During the electronic communication phase, the carrier, driver-tractor-trailer combination and transport order for the goods is considered to be pre-booked. When a specific carrier and shipper agree on all terms and conditions, the transaction is booked. The term "booked" results in a legally enforceable contract. Booked means that the shipping assets are no longer available to be assigned by the system during the pick-up and delivery times and days. In a truck lane scenario, the system joins a specific driver and a specific tractor and a non-specific trailer to a specific transport order. As explained later, in a lane assignment, the carrier is assumed to have a capable and an available trailer at his or her terminal (the location of various shipping assets). With the use of global positioning system (GPS) units and personal data assistant (PDAs) carried and removably mounted in the tractors and used by drivers, the electronic information system can monitor the location of the trailer, the driver and also handle electronic copies of the electronic shipping documents (bills of lading, warehousing documents, customs documents, etc.). Since the PDA can capture data relative to the electronic shipping documents (signatures, delivery or exception notes, etc.), the driver and others coming in contact with the goods on the trailer, can annotate the electronic shipping documents on the PDA. This annotation is electronically noted and uploaded from the PDA along with GPS data to the central computer operating the information system. This GPS data and electronic document data is associated with the transport order such that the carrier and the shipper and the customer having an interest in the goods under transport can see and view the electronic document and whereabouts of the goods or load. Government agencies or others interested in tracking goods subject to transit may also have access to this data including electronic documents subject to the transport order. Of course, security codes and passwords are used to limit access to the system data to protect commercial interests of the carriers and the shippers and the customers.

BRIEF DESCRIPTION OF THE DRAWINGS

Further objects and advantages of the present invention can be found in the detailed description of the preferred embodiments when taken in conjunction with the accompanying drawings in which.

DETAILED DESCRIPTION OF THE PREFERRED EMBODIMENTS

Figure 1:
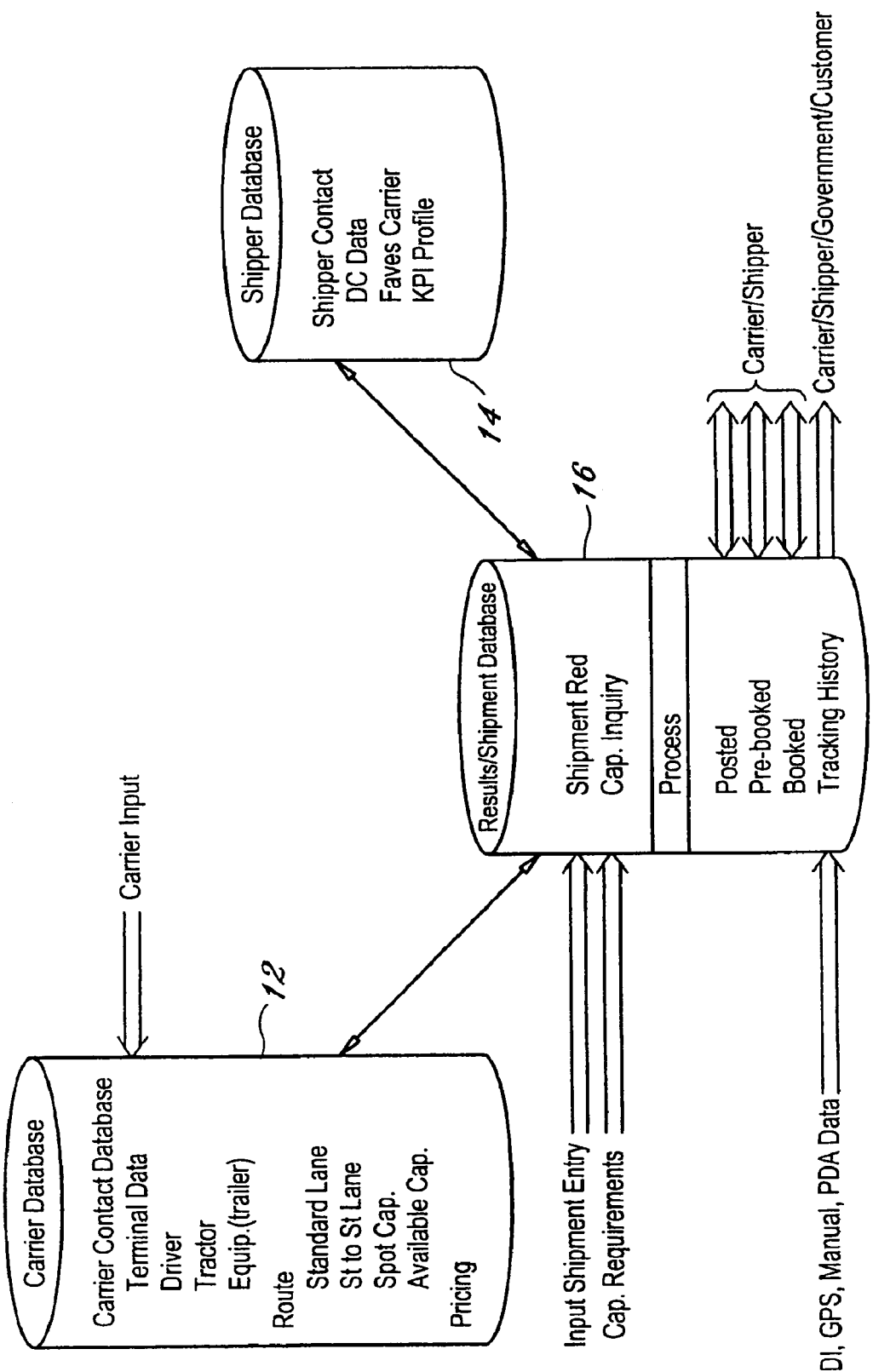
FIG. 1 diagrammatically illustrates an information system showing a carrier database, a shipper database and a results or shipment database and various inputs and outputs and processes utilizing in the data therein.

The present invention relates to a shipping information and capacity allocation system, a methodology for the same, typically operable over the Internet (with interconnected personal computer (PC) system, mini-computers and main frames (in certain situations)), or over a computer network (LAN or WAN), and various computer programs, computer modules and an information processing systems to accomplish asset allocation and shipment tracking system. In addition to the computer implementation of the inventive aspects of this invention, a business method is also encompassed herein.

It is important to know that the embodiments illustrated herein and described herein below are only examples of the many advantageous uses of the innovative teachings set forth herein. In general, statements made in the specification of the present application do not necessarily limit any of the various claimed inventions. Moreover, some statements may apply to some inventive features but not to others. In general, unless otherwise indicated, singular elements may be in the plural and vice versa with no loss of generality. In the drawings, like numerals refer to like parts or features throughout the several views.

The present invention could be produced in hardware or software, or in a combination of hardware and software, and these implementations would be known to one of ordinary skill in the art. The system, or method, according to the inventive principles as disclosed in connection with the preferred embodiment, may be produced in a single computer system having separate elements or means for performing the individual functions or steps described or claimed or one or more elements or means combining the performance of any of the functions or steps disclosed or claimed, or may be arranged in a distributed computer system, interconnected by any suitable means as would be known by one of ordinary skill in the art.

According to the inventive principles as disclosed in connection with the preferred embodiments, the invention and the inventive principles are not limited to any particular kind of computer system but may be used with any general purpose computer, as would be known to one of ordinary skill in the art, arranged to perform the functions described and the method steps described. The operations of such a computer, as described above, may be according to a computer program contained on a medium for use in the operation or control of the computer as would be known to one of ordinary skill in the art. The computer medium which may be used to hold or contain the computer program product, may be a fixture of the computer such as an embedded memory or may be on a transportable medium such as a disk, as would be known to one of ordinary skill in the art. Further, the program, or components or modules thereof, may be downloaded from the Internet of otherwise through a computer network.

The invention is not limited to any particular computer program or logic or language, or instruction but may be practiced with any such suitable program, logic or language, or instructions as would be known to one of ordinary skill in the art. Without limiting the principles of the disclosed invention any such computing system can include, inter alia, at least a computer readable medium allowing a computer to read data, instructions, messages or message packets, and other computer readable information from the computer readable medium. The computer readable medium may include non-volatile memory, such as ROM, flash memory, floppy disk, disk drive memory, CD-ROM, and other permanent storage. Additionally, a computer readable medium may include, for example, volatile storage such as RAM, buffers, cache memory, and network circuits.

Furthermore, the computer readable medium may include computer readable information in a transitory state medium such as a network link and/or a network interface, including a wired network or a wireless network, that allow a computer to read such computer readable information.

The term "database" means all types of data structures whether in flat form, such as a spread sheet, or other forms (such as a matrix of data) or any organized data structure, such that groups of data, associated with a single item, such as a truck or carrier asset, are organized into fields or sub-groups such that the group or record for a single asset can be easily compared or sorted or processed by association to similar sub groups for other asset records. Although one or more databases are identified herein, persons of ordinary skill in the art will recognize that a singular database or spreadsheet may be used or multiple databases may be employed rather then the few discussed in detail herein. Hence, the designation of a Carrier Price database, and a Shipping Asset database and a Results database is a conceptual tool employed herein to explain the dynamic operation of the system as a whole and such designations are not meant to limit the scope of the claimed invention. A single database with multiple indices may be more efficient than the separate databases discussed herein.

In the drawings, and sometimes in the specification, reference is made to certain abbreviations. The following Abbreviations Table provides a correspondence between the abbreviations and the item or feature.

| Abbreviations Table | |
|---|---|
| Admin | administration |
| Alert | electronic message to system operator, carrier or shipper |
| ASP | application service provider - server on a network |
| bd | board |
| cap. | available capacity (avail. cap.), dynamic capacity (dyn. cap.), spot capacity (spot cap.) |
| Crr | carrier (trucking company, freight forwarder, drayage, railroad, airline etc.) |
| comm. | communications, typically telecommunications |
| comp | computer |
| CPU | central processing unit |
| cust'r | customer who owns or has rights to the goods being shipped |
| DB | data base |

-continued

Abbreviations Table

| | |
|---|---|
| DC | distribution center, usually, the primary location of goods to be shipped |
| del | delivery location or destination |
| destin. | destination, such as the final delivery point for goods being shipped or a destination of a leg of a multi-modal transportation transaction |
| displ | display |
| doc | document (may be electronic or printed out) |
| edi | electronic data input (typically a standard format electronic input/output format and data stream and comm. protocol) |
| elec. doc. | electronic document, typically a signed PDF doc |
| equip | equipment, typically a trailer or means to carry the goods |
| err | error, typically resulting in an Alert to a party |
| except. | exception noted as a problem with goods being shipped |
| faves | favorites |
| Geo Fence | a GPS signal indicating that an item is within or is without a defined geographic region from a known location |
| gov't | government or agency inquiry |
| GPS | global positioning system equipment, transceiver, or signal |
| I/O | input/output |
| id | identify |
| KPI | key performance indicators |
| LTL | less than full truck load of goods |
| mem | memory |
| ntwk | network as in "comm ntwk" - communications network |
| pgm | program |
| PO | purchase order |
| prox. | proximity, such as xx miles near a zip code or location |
| p/u | pick-up location where the goods are to be picked up |
| req | request |
| rpt | report |
| sch | search |
| schdle | schedule |
| sel | select, normally, an input selected by a user |
| Shpr | Shipper, the company wanting to ship goods |
| std | standard |
| St. | state, such as in a state to state route lane, e.g., FL to NY |
| sys | system |
| t | time |
| Term. | primary, initial location of assets, such as trailers, tractors, etc., used to ship goods |
| tele-com | telecommunications system or network |
| URL | Uniform Resource Locator, x pointer, or other network locator |

The primary goal of the method subject to the present invention and the information processing system is to find the best match for a shipper sending a shipment (represented by a transport order for goods) with a carrier having the shipping assets or capacity to move the shipment, based on individual preferences determined by both parties and using the carriers' identified price per mile as the tiebreaker.

The key criteria for searching the database, extracting records, sorting the records and then displaying the selection are set forth in the following table.

Search and Selection Table - Key Criteria

Close Proximity of equipment (trailer) to the shipment pick-up location
Close proximity of the Truck/Driver combination to the trailer
Equipment type (Specific or All) (for example, 53 ft refrig., 45 ft dry, 53 ft)
States/Regions Serviced by Carrier Organization
Pick-Up and Delivery Date Constraints
Days of Service Constraints
Sorted by Price or KPI (Shipper selects sort criteria)

See FIGS. 1 and 2 and the associated description discussed later which more fully explains this and other features of the information system and shipping asset assignment or scheduling method.

Carriers who use the information system, sometimes called "members," have full use of the asset management functionality of the system including the ability to allocate their assets for the future to make them available for shipper view and selection for a desired shipment of goods. Pricing and performance play an important role in the sorting and display of available capacity information. At the option of the specific shipper interacting with the system after input (manual or automated) of a transport order to shipping load record, capacity is displayed to the shipper by lowest price or best KPI (Key Performance Indicator). KPI is represented based on the history of shipments vs. the number of exceptions (errors in shipment) that have been logged into the system for a specific carrier. The shipper selects one performance level L2-14; one transit time level (an one time delivery ration) L2-H; and one price level. If a price factor is important, Level H, and performance (lack of exceptions or delivery problems) is not (level L2) and transit time (one time delivery ratios) is less critical (level M), the lowest price carrier is displayed first.

Key Performance Indicator (KPI) Table

| Performance | Low (L2) | L1 | Med. | M2 | High |
|---|---|---|---|---|---|
| Transit Time | L2 | L1 | M | M2 | H |
| Price | L2 | LI | M | M2 | H |

Shipper members using the system have the ability to enter shipments (transport orders for goods subject to transport) either manually or through an automated data interface (EDI or web-based input form) to post loads into the system and view available capacity of carrier members. In addition, shippers have the ability to manage their own in-house shipping assets or fleets (tractors, trailers, drivers and equipment) by using the system's shipper asset management/route scheduling tools (known as Shipper "B").

The following table shows various types of shipments based on full truck load.

Shipment Table

Shipper - Single pickup to single destination shipment.
Shipper - Multi pickup to single destination shipments (line haul or run).
Shipper - Single pickup to multi destination (line haul or run).
Carrier in-house shipment. Used to allocated activity for shipments not entered to the system in order to provide future available capacity information.

For each shipment record, the status codes listed below are used. The terms "posted" and "pre-booked" and "booked" are explained, in part, in this table. The Shipment Entry Input Table is set forth later. The codes form the Status Code Table are associated with each shipment record to show the status of the record.

Status Code Table - Shipment Record

| Status # | Description | Explanation |
|---|---|---|
| 10 | Hold | Shipment (transport order or shipment record) loaded in system with invalid data - error code set |
| 20 | Posted | Shipment Entered into system |
| 30 | Pre-Booked | Shipment with Carrier Selected (shipping asset temporarily withdrawn from "available capacity") |

| Status Code Table - Shipment Record | | |
| --- | --- | --- |
| Status # | Description | Explanation |
| 40 | Booked | Shipment after Carrier Accepts |
| 50 | En-Route | Shipment Currently Moving |
| 52 | En-Route-Arrived | Geo Fence Triggered via GPS device |
| 70 | Delivered | Shipment Delivered |
| 71 | Delivered-Pending | Shipment Delivered with Dispute or a Dropped Trailer Pending Count |
| 72 | Delivered-Exception | Shipment Delivered with Overages, Shortages or Damages (OS&D) |
| 80 | Invoiced | Shipment Invoiced by Accounting Sys. |
| 90 | Completed | Shipment Completed |
| 95 | Delete | Shipment Cancelled by Customer |
| 99 | Cancelled | Shipment Cancelled by Sys. Admin. |

The following table shows a less than full truckload shipment record. Less then full or LTL truck load shipment records represent unused capacity which is difficult to sell or match up with an acceptable shipper.

| LTL Entry Table |
| --- |
| Carrier: WN. TRUCKING |
| Shipper: King Products |
| BOL Number (bill of lading no.) |
| PRO Number (government or agency assigned no.) |
| Shipper PO Number |
| Stop Number |
| Equipment Type |
| Class/NMFC |
| Quantity |
| Load Size |
| Linear Feet Required |
| Pick-Up Number/Seal Number |
| Pricing Information: Carrier Price |
| Pick-up Information: Delivery Location, address, city, Delivery Date |

Data entry methods may vary and may include manual input, electronic input or automated input such as matching existing inventory control systems to the input categories of the present system. Shipper contact data (name, address, phone, fax, email, etc.) and shipper distribution center (DC) data entry is important. A DC is the location where a particular shipper has a warehouse of goods subject to transport to other locations. New shipment entry may be manual or automated. The table below lists typical fields for a shipment record. Pull down menus are used for certain fields, such as equipment or trailer type. The system generally uses zip codes to sort and determine proximity to certain locations. See FIG. 2 and the associated description discussed later which more fully explains this and other features of the information system and shipping asset assignment or scheduling method.

| Shipment Entry Input Table |
| --- |
| Initial Pick up Information: Pick Up Location, Address, City/State/Zip |
| Shipment Will be Ready: Date, Time |
| Contact Name/Telephone Number |
| Final Delivery Information: Delivery location, Address, City/State/Zip |
| Must Be Delivered No Later Than: Date, Time |
| Contact Name/Telephone Number |
| Shipment Information: Equipment (trailer) Type; Shipment Type |

The following tables show typical data entries for carriers having shipping assets they wish to exploit. The carriers may place shipping assets on the system for all shippers to use or schedule or the shippers may have "in-house" or fleet trucks used only by the owner-shipper. In-house or fleet trucks are not typically subject to hire by other shippers.

| Driver List Table |
| --- |
| ID |
| Driver Name |
| Terminal of Carrier (crr.) where driver typically is assigned from |
| Active Y/N |
| PDA Password |
| Calendar |

| Add/Edit Driver Table |
| --- |
| Terminal Center |
| Driver's First Name |
| Driver's Last Name |
| Dispatch From Address |
| City |
| Driver's Email Address |
| Driver's Mobile Phone Number |
| HazMat Certified |
| PDA Unit ID Assigned |
| Commercial Driver's License |
| Driver's Days of Work |
| Independent Contractor |
| Active (Yes/No) |

| Add/Edit GPS Devices Table |
| --- |
| Company, Company ID, Unit ID |
| Type Manufacturer, Serial no. |
| Firmware, Mode |

| Current Lanes and Cost Table |
| --- |
| Lane |
| Start Zip, Start City, Start State |
| End Zip, End City, End State |
| Expires |
| Equipment Type |
| Price Dry, Price Reefer (refrigerator), Price Flat |
| Lane Cost Dry, Lane Cost Reefer, Lane Cost Flat |
| Miles Willing to Drive Empty at No Charge to Get a Load |
| Preferred Shipper Name |
| No. Truck |

Data may be entered manually or electronically. Further, brokers resolving scheduling issues and pricing aspects are typically employed in the shipping industry. The system can be used by brokers to quickly schedule available carrier capacity and match that available capacity to the transport needs of a shipper for a designated load. The system is designed to accept electronic data entries are set forth in the following table.

| Custom Data Feed Support Table |
| --- |
| EDI X.12 ASN Support |
| EDI Carrier Shipment Status Information and Updates (990, 210, 214) |
| Custom Flat File Purchase Order |
| Email Attachment Shipment information (Custom) |

Shipment tracking is provided for all carriers, shippers, brokers and to the system administrators using the information processing system with input coming from a number of manual and automated interfaces. As each event in the handling of the goods subject to transport occurs, a historical record is logged and maintained in the system.

| Historical Movement Table |
| --- |
| Informational Changes<br>All Events |

The following Booked Shipments Table can be accessed (that is, the database can be searched and a singular or multiple records can be retrieved based upon selection of the field category).

| Booked Shipments Table |
| --- |
| Shipper - Carrier - Run<br>Reference - Stops<br>Pick Up Date - Pick Up - Delivery Date<br>Destination - Carrier Tracking Table<br>Capacity<br>PRO (gov't id), PO, BOL<br>Run (lane), Shipper, Tractor, Trailer<br>Origin, Destination<br>Status of Shipment (see Table above), Excpt.<br>Posting Date |

| Shipment Status Table |||
| --- | --- | --- |
| Shipper | Carrier | Run |
| PRO | BOL | Activity |
| Shipper | Shpr. Acct. Owner | |
| Carrier | Crr Acct Owner | |
| Run, BOL, PRO, Stops, Pick Up Date, Pick Up, Delivery Date ||| 
| Delivery, Broker ||| 
| Details (selection of "details" leads the user into more detailed records of the shipment) ||| 
| Shipment Journal (log notes for a user, a driver (with PDA), telephone notes from driver, etc.) ||| 
| Status |||

| GPS Device Log Table |
| --- |
| GPS id no.; Crr. id no.<br>Control or Receive<br>MSG (message) Codes; Subcode; Message; Unit id<br>Time, Tracking |

| Shipment Notes Log Table |
| --- |
| Company Notes, User, Date-time Created, Content of notes ("LS shipper Corp. advise me that . . .) |

| Shipment Event History Table |
| --- |
| Run No. (assigned by sys.-sys. tracking no.), Shipper, Shipment Status, Accepted Date, Pick Up Date, Delivery Date, POD Received, Invoice Received, Invoice Number, Line Haul Charge, Accessorial Charge, Exceptions |

When a shipment encounters a problem, the information processing system supports automated and manual exception entry to effectively build a journal and supplemental journal for the shipment. These entries are noted above in some of the tables.

| Action Items Table (Admin) |
| --- |
| Shipment ID, Code, Date, Priority<br>Comments: Truck 521 has a Spot Rate for $1.85 per mile from Pilot |

Shipping assets (real, currently available or dynamic—not specifically identified assets but assets available in the future) within the system need to be tied to a home terminal of a carrier or to a Distribution Center for a shipper. The system handles a hierarchy of organizations including a parent organization to manage the assets and information related to those assets at each terminal (Term) or distribution center (DC). Each child relationship in the organization will not have access to equal children at their respective hierarchy. Simply, a user can see all the children or nodes of the organizational tree that are lower than their respective login home. Thus a parent user will have the ability to view the entire organization form the top down. The system has security password control and log-in historic data entries to maintain this security of information.

Each Terminal or DC is the controlling home base for all assets. When adding or editing an asset, validation of a home terminal/DC is enforced. All assets are required to have home terminal/DC with each specific asset having their own specific information that is required and validated.

"Capacity" is segregated into "available capacity" and "dynamic capacity" and "spot capacity." The primary differences between these categories are that spot capacity is unique and is typically not a shipping asset originating from a Carrier Terminal but is a truck on the road in anon-standard location, such as when a non-tracking truck has just off-loaded goods and is now empty. Dynamic capacity is a term used for explanatory purposes only and represents a non-specific or a non-identified trailer or other asset that (a) is available but (b) is not identified with certainty as is all other assets. Drivers, tractors, trailers and other equipment in the system are identified with certainty such that the system can issue scheduling reports, email communications, etc. to carry out a booked transport order. A dynamic assignment means that the carrier must provide the shipping asset at the terminal. Typically, dynamic capability is used with lane assignments or lane routes.

Available capacity is defined as a company (carrier or shipper) having a three part combination of driver, tractor and trailer available to move freight for a specified period of time (start date to end date). The system marries or joins the driver, tractor and trailer combination. The first step "joins" the driver and tractor through the asset management screens. See FIG. 3 and the associated description discussed later which more fully explains this and other features of the information system and shipping asset assignment or scheduling method.

When a shipper enters a shipment into the system the following occurs. The shipper user is directed to the capacity screen to view all capacities available in the system along with the appropriate pricing to move this load (previously, the shipper has entered the transport order, see Shipment Entry Input Table above). The Capacity Report Table is set forth below. This view or display of available shipping asset capacities uses the postal code or zip code of the pickup location (the first pickup location if a multi-pickup shipment record) to look for the nearest trailer (proximity record search) (permanent/non-permanent trailer) matching the equipment type displayed on the capacity "choose" screen. The shipper selects the equipment or trailer or selects "all" or selects one of a trailer type in a pull down menu. Once a trailer is found or selected by the shipper (see FIG. 1 and Ship Entry Table), the nearest driver/tractor is located to that trailer (proximity search, zip code based), thus completing the three part combination of a driver-tractor-trailer required to move a shipment. The initial view or display of "capacities available" screen is based on the equipment type of the shipment thus allowing the user (typically, a shipper) to change equipment in order to view other options and pricing.

There are 2 major differences in the type of trailer, a Non Permanent Tractor/Trailer and a Permanent Tractor/Trailer. Typically most tractors have the ability to switch the trailer based on needs and the assets available to them at their terminals. These are Non Permanent Tractor/Trailers. The asset management tool herein allows for a specific tractor and specific driver to be electronically and automatically joined thus making the driver/tractor available for shipments based on their proximity to the trailer regardless of specific equipment. Email communications are used to schedule these assets. With respect to Permanent Tractor/Trailers, straight trucks are permanently attached to the tractor and can never be disconnected so technically the trailer is 0 (ZERO) feet away from the tractor/driver combination, thus this 3 part combination (driver-tractor-trailer) will always be guaranteed.

The shipper may wish to use a specific carrier or have a favorite group of carriers. See Carrier Search Table. Further, the carrier or the shipper may want to view an available capacity report in the Capacity Report Table below.

| Carrier Search Table | |
| --- | --- |
| Zip Code | Radius (in miles) 200 |
| And/Or search | |
| Carrier Name | |
| City | |
| Equipment | |

| Capacity Report Table | | | | | |
| --- | --- | --- | --- | --- | --- |
| State | Zip | Range | Equipment | Search | |
| Type, Equipment | | | | | |
| City, State, Zip | | | | | |
| Availability | | | | | |
| Destination State(s) | | | | | |

When a State-to-State record (lane route) is added to the system by a carrier, the system will display a capacity to any shipper that matches a shipment pickup and delivery postal codes. In the case of a multi-stop shipment, the first and last stops are considered the pickup and delivery.

Since in a dynamic assignment mode, the system does not know where a trailer is, the pricing for mileage is calculated like all current shipments but the trailer location is considered to be at the zip code of the terminal the lane is assigned. Each State-to-State lane record is required to be tied to a specific terminal based on the Beginning Postal Code (zip code). The assumption here is that this is a non PDA/GPS equipped asset within the system thus a trailer move will not be created. If a dynamic capacity is "chosen" the system will create a unique DRIVER, TRACTOR, and TRAILER three part combination and immediately assign the shipment to this capacity. Subsequent updates will require manual entry by the carrier, via EDI or a custom data feed, to provide status updates to the location tracking and status updates. Capacities for additional shipments will continue to appear until the shipping assets allocated has been exceeded for the specified lane. The formula for this is complex because it takes into account assignments and shipments en-route and is continually reviewing pickup and delivery schedules of active shipments (including overlaps). These aspects represent the dynamic assignment nature of the invention. At no point in time can more assets be committed than allowable. See FIG. 4 and the associated description discussed later which more fully explains this and other features of the information system and shipping asset assignment or scheduling method.

Each dynamic capacity is dissolved on delivery and the location of the capacity is no longer available. The availability comes from the "active" count being decreased by one, thus another capacity will appear again if a shipment is entered for the beginning postal code of the state-to-state lane record. The carrier running assets along a specified lane route or a shipper seeking to transport goods many times along the same or similar route may access the lane route tables below.

| Lane Inquiry Table |
| --- |
| Start Zip, End Zip, Miles, Lanes |

| Current Lanes and Cost Table |
| --- |
| Lane |
| Start Zip, Start City, Start State |
| End Zip, End City, End State |
| Expires, Equipment Type |
| Price Dry, Price Reefer, Price Flat, Lane Cost Dry, Lane Cost Reefer, Lane Cost Flat Miles |
| Shipper, Numbers of Trucks in Lane |

Spot Capacity is the quick method for carriers to enter/create a Lane Rate into the system while immediately dedicating a user defined three part asset combination capable of moving a shipment. When a Spot Capacity is created, a unique Tractor, Trailer and Driver combination are instantly created along with a Default City Pricing Lane with matching expiration dates. The Spot Capacity records cannot be edited but can be deleted while active. A spot capacity will not have a GPS/PDA installed.

| Spot Capacity Input Table |
| --- |
| Tractor Number, Equipment Type, Terminal Center |
| Dates Available for Haul Freight, From date - Time, Until date-Time |
| Location of Available Equipment, City, State, Zip |
| City Search, Range of Miles subject to search |

-continued

Spot Capacity Input Table

User Select the preferred destination state(s) to deliver freight:
At least one state must be selected: pull down menu of states, - otherwise City Search
Prices: Rate, Rate/Mile, Flat Rate Spot Capacity Created Table Crr. Company Name, Address, Phone Number, Member Since
Comments: Truck 521 has a Spot Rate for $1.85 per mile from Pilot The pricing engine for shipment transactions is used whenever capacity records are displayed for either a shipper or customer service for shipments in "POSTED" status. When shipments are entered by a shipper, each shipment (one per stop) also allows for a shipper to enter accessorial codes that may apply for this shipment. An accessorial is a service or feature that may optionally be provided by the carrier and such accessorials represent important aspects of the decision to ship via a particular carrier. This accessorial pricing is an important aspect of the pricing structure, as the correct price of the shipment will be built based on these add-on charges supported by each carrier that has available capacity in the immediate proximity.

There are a number of critical areas a price within the system that can determine the price of a transport order based on the following hierarchy within a carrier profile to determine the correct pricing to be used. (A) Core Shipment Price: (1) Customer Specific Pricing: A carrier can create a specific lane cost and map it to a shipper if the shipper has the carrier listed as a favorite carrier in the shipper profile. Any shipment entered by a shipper that matches this lane (from and to postal code) will display the lane price when the carrier has an available capacity. (2) Lane Cost from the "From Zip" proximity to "Destination Zip" proximity: A carrier can create a lane cost based on proximity (miles) of a beginning postal code to proximity (miles) of a destination postal code. (3) Lane Rate per mile from Zip proximity to proximity: A carrier can create a lane price per mile cost based on proximity (miles) of a beginning postal code to proximity (miles) of a destination postal code. (4) State to State: If a carrier has been designated a "State to State" Dynamic Pricing carrier a "State to State" dynamic price per mile can be created that will generate a dynamic capacity up to the committed number of concurrent assets per state-to-state lane. A minimum price for each lane is supported. (5) City Default Pricing: A carrier can create a "Default City Price" lane (per mile) for a proximity to a postal code (mile) for a shipment having a beginning postal code with a destination anywhere. (6) Default price from carrier profile irrespective of commodity will be used as a stop gap price. The minimum price per shipment will also override any price that has been calculated to ensure the price is never lower than the "carrier minimum price."

Accessorial pricing is also entered into the system by the carrier. Each carrier has the ability to manage their accessorial charges to be applied to all shipments. This also applies to each individual stop within a "run" or "Line Haul". The "new load" or NL action (Carrier Selected) has a link to view all pricing prior to acceptance of the shipment. In order to financially compensate the system administrator operating the present system, the administrator (a) marks up all standard carrier pricing by a configurable percentage and (b) bills the shipper directly and (c) pays the carrier typically within 30 days of receipt of proof of delivery. Currently an 8% system administration fee is added to each capacity price determined by the pricing engine.

Mileage Calculation for Pricing: The pricing for a non-broker supported shipment will follow the following rules for a multi-stop truckload. For every available capacity on the system that fully qualifies for consideration in moving a shipment, following rules will be applied. The standard pricing algorithm and priorities will be followed using these rules. (1) The origin and the final destination will be used to calculate the actual miles to billing purposes. (2) Each Stop added to the original shipment will have the accessorial page appear during shipment entry to allow the stop charge accessorial indicator to be flagged for the stop. This implies that carriers with accessorial stop charges configured in their profile will be calculated into the price shown on the capacity screen. If this is not configured in the accessorial screen, effectively the price will be set to 0.00 (zero). (3) All other accessorial charges input by the shipper at shipment entry will also be considered in the price. Each stop will have the ability to maintain accessorial needs. (4) The carrier profile (see carrier database 12, FIG. 1) contains the number of miles an asset will move at no extra change to pick-up a shipment. If the shipment is farther away than the miles-willing-to-go in the profile, the extra mileage will be added to all pricing calculations using the carrier profile default price per mile value.

Booking Table

| Shipper | Pick Up State | Delivery State | Equipment |
|---|---|---|---|

Shipper, Run, Sys Reference No., Stops, Pick Up Date, Pick Up, Delivery Date, Delivery Weight, Equipment Booked Shipments Table

| Shipper | Carrier |
|---|---|

Run, Reference No., Stops, Pick Up Date, Pick Up, Delivery Date, Destination

Shipment Status Table

Shipper, Carrier, Run sys. no.
PRO, BOL, Activity, Shipper, Shpr. Acct. Owner, Carrier, Crr. Acct Owner
Run, BOL, PRO, Stops, Pick Up Date, Pick Up, Delivery Date, Delivery Broker, Details (selectable to additional linked records)
Shipment Journal (input/view log data), Status Brokerage Pricing Shipments processed through the brokerage have a manual override to enter the amount a carrier is to be paid and the amount a shipper is required to pay the system administrator. Accessorial charges are included in the brokerage amount so no accessorial entry is considered or captured.

Salesman Commission Commissions for every shipment have the possibility of a 4-multiple split. Currently, the following four-way split is being captured: Shipper Member Salesman Account Owner; Carrier Member Salesman Account Owner; Shipment Salesman (Shipper) who processed this particular Shipment for Spilt Commission; Shipment Salesman (Carrier) who processed this particular Shipment for Split Commission. Additional commissionable parties may be added for multi-leg/multi-modal transactions.

The system generates many electronic reminders or "action items" to facilitate the scheduling of shipping assets with transport orders. Action Items are created throughout the process flow based on specific events. These Actions are programmatically designed to be directed and sent to the appropriate party as an alert or action item requiring a decision to be made by the member user. Although each Action can be viewed by the system administrator, or one of its many customer service representatives (collectively identified herein as "system administrator," a singular nomenclature for many people), a number of events require the system administrator to intervene immediately. These Priority action items are part of the Customer Service or system administrator module and can be configured to generate emails to the system administrator and/or the carrier, shipper or government agency if public safety and welfare is at risk.

Action Items Table (Admin)

Shipment ID, Action Code, Date, Priority
Comments: Truck 521 has a Spot Rate for $1.85 per mile from Pilot The system can generate many reports and displays to track the shipment and to show the efficiency of the scheduling process. The following tables list Action items codes and list administration reports. The Code Table shows who gets the electronic communications. See FIG. 5 and the associated description discussed later which more fully explains this and other features of the information system and shipping asset assignment or scheduling method.

Advanced Reports Table

| | |
|---|---|
| OPERATIONS: | Route Activity, Lane Activity, Spot Analysis, Accepted Shipments by Date Cancelled Shipments by Date, Company Login Activity |
| SALES: | Sales By Date, Sales By Account Owner, Shipper Referrals |
| ACCOUNTING: | Monthly Commission, Commission Control, Unresolved Shipments, Unresolved Completed Shipments, Daily Accounting Activity, Freight Payment Entered |

Action Item Listing Table

| Action Item Code | Description | Shipper | Carrier | Sys. Admin |
|---|---|---|---|---|
| AS | Assign Shipper Account | | | X |
| CC | Carrier Change | X | | |
| CD | Carrier Declined | X | | |
| CI | Carrier Invalid | | X | |
| DA | Driver Alert | | | X |
| DD | Possible Delayed Delivery | X | | |
| DP | Possible Delayed Pickup | X | | |
| DS | Damaged Shipment | | | |
| EI | EDI Information | | X | |
| EM | EDI-Multiple PO's | X | | |
| EP | EDI-PO Does Not Exist | X | | |
| MS | Missed Stop | | | X |
| ND | New Deliver | | X | |
| NL | New Load | | X | |
| PC | Phantom Capacity | | | X |
| PS | Problem Shipment | X | | |
| S1 | Company Profile | | X | |
| S2 | Terminal Setup | | X | |
| S3 | User Setup | | X | |
| S4 | Driver Setup | | X | |
| S5 | Tractor Setup | | X | |
| S6 | Trailer Setup | | X | |
| SD | Driver Swap Required | | X | |
| TA | Tender Accepted | X | | |
| UD | Unavailable Driver | X | X | X |
| VT | Video Tour | | | X |
| ZP | Zip Default Pricing | | | X |

Action Code Table

AS Assign Shipper Account: Created whenever a CS (system administrator representative) changes the internal account owner of an account (both carrier and shipper) to notify both the id owner and new owner of the change. The use of the AS action is strictly a system administrator Customer Service internal function.

CC Carrier Change: Created when an EDI or Purchase Order data feed, indicates a shipment/PO that is already been tendered, receives a change in tender(carrier assignment), thus resulting in 2 carriers still assuming responsibility for moving a shipment.

CD Carrier Declined: Created when a "new load" or NL Action is declined by a carrier to notify the shipper they cannot actually fulfill the movement of the shipment. The PDA supports a number of reason codes to explain and log the issue. This will require the ship to re-select available capacity is required.

CI Carrier Invalid: EDI information from a Carrier is received that the system is not configured to process. The mapping of the EDI requires a properly mapped SCAC code to the system administrator to assure proper information processing.

DA Driver Alert: When a Driver presses the "Alarm" button on a GPS device, the DA action is created along with email notification to Customer Service that the alarm was depressed. This will only be available on devices with an alarm button.

DD Possible Delayed Delivery: When GPS information is received in the system and a shipment tied to this device and tractor has an expired original delivery date, a DD action is created along with an exception is posted to the shipment itself.

DP Possible Delayed Pickup: Created when the PDA driver sends a message indicating he is delayed in picking up the shipment.

DS Damaged Shipment: A DS Action is created to Customer Service when a shipment is marked as received-damaged in order to provide the shipper and carrier resolution options.

EI EDI Information: Customer Service - system administrator - Internal request to initiate EDI information to a Carrier.

EM EDI - Multiple PO's: A&P Custom Purchase Order Interface Action to identify the possibility of duplicate unique Purchase Orders.

EP EDI - PO Does Not Exist: EDI information from a Carrier is received that contains a Purchase Order Reference that is not currently in the system.

MS Missed Stop: When GPS information is received in the SYSTEM while a carrier is delivering a line haul or run and the Delivery Geo Fence is triggered for a delivery and a previous stop has not been delivered (or en-route-arrived) an MS action is created.

ND New Delivery: The ND action provides the dispatcher the delivery contact information in order to schedule the appointment times. Future Available Capacity is created based on the delivery appointment window plus 3 hours in order to allow unloading time.

NL New Shipment OR New Load: Created when a shipper (or Customer Service - system administrator) chooses an available capacity to move the shipment, sending the NL action to the Carrier (dispatcher) to allow acceptance or declination of moving the shipment. Once accepted, the NL action also provided the dispatcher the pick-up contact information In order to schedule the appointment times. This also creates the ND and ZP action items.

PC Dynamic Capacity: A PC Action is created when a capacity is chosen by a shipper for a carrier configured for State-to-State pricing and capacity control. Customer Service - system administrator - will provide Virtual Dispatcher support for the carrier. This is to be used for larger organization in order to create capacity availability quickly.

PS Problem Shipment: A&P Custom Purchase Order Interface Action to identify inconsistencies in the data from A&P.

S1 Company Profile Video: When a new Carrier signs up in the system the Set-Up action items (S1-S6) are generated to the carrier account that can be viewed by all users within the organization until removed. Key components for initial sign-up include: Agreement Read, Insurance Coverage, Coverage States, Minimum Shipment Charge, Default Price per Mileage, Miles a driver/tractor willing to travel at carrier expense, Lane Rates and Pricing, Accessorial Pricing Information S2 Terminal Setup Video: When a new Carrier signs up in the system the Set-Up action items (S1-S6) are generated to the carrier account that can be viewed by all users within the organization until removed. Key components for terminal set-up include: Definition of each terminal, satellite, or yard to be used as home base (responsible entity) for each asset of the organization.

S3 User Set-up Video: When a new Carrier signs up in the system the Set-Up action items (S1-S6) are generated to the carrier account that can be viewed by all users within the organization until removed. Key components for user set-up include: Security of functionality tied to "home base (terminal) for access to hierarchal information. Security Access for each User S4 Driver Set-Up Video: When a new Carrier signs up in the system the Set-Up action items (S1-S6) are generated to the carrier account that can be viewed by all users within the organization until removed. Key components for driver set-up include: Security of functionality tied to "home base (terminal) for access to hierarchal information; Type of Driver; Driver Classification and Expiration.

S5 Tractor Set-Up Video: When a new Carrier signs up in the system the Set-Up action items (S1-S6) are generated to the carrier account that can be viewed by all users within the organization until removed. Key components for Tractor set-up include: Security of functionality tied to "home base (terminal) for access to hierarchal information; Link GPS device to specific Tractor; Permanent or Non Permanent Trailer attachment; Age of Equipment S6 Trailer Set-Up Video: When a new Carrier signs up in the system the Set-Up action items (S1-S6) are generated to the carrier account that can be viewed by all users within the organization until removed. Key components for trailer set-up include: Security of functionality tied to "home base (terminal) for access to hierarchal information; Equipment Type SD Driver Swap: A SD action is created when a driver with a PDA sends a "Cant Pickup". This gives he dispatcher a chance to re-direct another asset utilizing the Swap functionality of the system.

TA Tender Accepted: A TA action is created when a pre-tendered carrier (A&P) accepts a shipment within their system.

UD Unavailable Driver: The UD Action is created when a NL action is declined to remind carrier (dispatcher) to check on the driver in the event they are currently unavailable.

VT Video Tour: The initial System Overview for a Carrier to provide the overall navigation and operability of the system In addition the Set-Up action items (S1-S6) are generated to the carrier account that can be viewed by all users within the organization until removed.

US Undeliverable Shipment: Created when the PDA driver sends a message indicating he is cannot deliver a shipment.

ZP Zip Default Pricing: The ZP action is used to create a price per mile from a postal code (and proximity) for a short period of time. The ZP is created for each shipment (final destination) when the NL action is completed.

GPS: The GPS devices, assigned to a tractor asset, deliver a continual stream of information based on the configuration of the device to our servers. This information is processed and married with the asset and shipment information within the system to offer real-time location information to determine the following within the system: Location Information; Distance Traveled; Predictive Late Arrivals; Availability Information; Door Open/Close Sensor detection to monitor load or goods on trailer; Climate/Temperature Sensor Detection; J-Buss Engine Diagnostics; Real Time and Historical Web Map Generation; By Shipment; By Asset (Start and End Times); "ALARM" (Red Button) to inform Customer Service—system administrator—of alert with all relevant information (data can feed other emergency response systems).

GPS Geo Fence capability is also available to determine is an Asset has crossed within a specific proximity of a Geo Fence. Currently, the Geo Fence signal is the notification of a delivery arriving near the delivery destination.

PDA APPLICATION: In order to augment the manual entry and EDI updates of shipments in the system, the asset management system allows for the assignment of a PDA to a driver and transmits pickup and delivery information to the PDA through the GPS device. The application on the PDA allows a driver to collect signatures and shipping information while en-route to seamlessly transmit these events and information to the system. This process informs the appropriate parties in the event exceptions occur while building logs for all events.

FIGS. 1-6 diagrammatically show one methodology to carry out the dynamic and predictive information system and method for assigning shipping assets.

FIG. 1 diagrammatically illustrates carrier database 12, shipper database 14 and results or shipment database 16. Carrier database 12 includes carrier contact database listing typical information such as name, address, telephone number, contact name, email, etc. Further, this information includes the name, address and contact data for each carrier terminal (Term.) or series of carrier terminals at which a plurality of shipping assets are available to that carrier. The term "carrier" includes a freight forwarder or drayage company. A carrier controls shipping assets such as drivers, tractors, trailers and/or other equipment. A carrier may have more than one terminal at which drivers, tractors and trailers originate. Carrier database 12 also includes a driver database, a tractor database and an equipment or trailer database. The Driver List Table and Add/Edit Driver Table identified above provide additional information on this topic. A tractor and/or a trailer may be equipped with a global positioning system unit or GPS unit, which, when activated, identifies the location of the shipping asset. Further, the GPS system may be linked or coupled physically to a personal data assistant or PDA. The PDA is operated by the driver and other persons who may physically come in contact with the load or goods subject to a transport order. The PDA can store electronic shipment documents and further the PDA has an input device enabling the driver and/or the person physically at the load to annotate the electronic shipment documents. The Add/GPS Device Table listed above identifies some additional information that would be part of the carrier contact database or carrier database 12.

Carrier database 12 also includes route information defining a service area or service region serviced by the particular carrier. The route information may also include standard lane information. As is known to persons in the shipping industry, a lane is an often traveled route covered by a shipping asset. These lanes may be city to city or may be state to state lanes. Further, carrier database 12 includes spot capacity and available capacity information records. Also, pricing information for the lanes and individual shipments and the accessorial charges is provided and logged into carrier database 12. The current lanes and cost tables set forth above are included in the carrier database 12. This information is loaded into carrier database either manually or electronically. Electronic data input or EDI is employed in some circumstances.

Shipper database 14 includes a shipper contact database listing name, address, contact information, fax, email and other information necessary to identify the shipper in the electronic space. Shippers typically have distribution centers (DC) which either receive goods or which are utilized as distribution points for goods subject to transport. The shipper database 14 also includes "favorite" carriers as well as key performance indicators or KPI profiles which are important to the shipper. The carrier may have special prices for a shipper listing the carrier as a "favorite." As discussed above in connection with the Key Performance Indicator Table, the shipper may identify whether performance is a key factor, transit time or the time to deliver a load or the price. By selecting one of five levels Low (L2) through high (H), the shipper provides a performance index which is used in the results or shipment database 16 to sort carriers subject to a transport order for goods subject to transport. Price is tie-breaker in the sort, that is, the best price is displayed first. Shipper information is input either electronically or manually.

The results or shipment database 16 handles data relative to each shipment record or transport order. The shipper typically inputs shipment entries manually or through EDI or other web based input pages. An example of the shipment input is shown above in the Shipment Entry Input Table. A shipper or carrier may request a capacity report. See the input to database 16. The Capacity Report Table set forth above is an example of such a request. Users, that is carriers, shippers, or personnel from the system administrator, may select various fields shown in the tables to search the database. Further, the carrier may request information in the form of an Asset Inquiry Table discussed above in order to determine the amount and the activities of his or her shipping assets. In addition, the carrier or the shipper may request a Capacity Inquiry and the Available Shipments Table set forth above. This is an example of this type of input in database 16. The shipper may have a favorite carrier and the shipper may conduct a Carrier Search and the Carrier Search Table set forth above represents this capacity request. Further, a shipper may want to transport a load of goods through a recognized shipping lane. The Lane Inquiry Table set forth above is another capacity request.

FIG. 1 shows that the results database 16 accepts EDI data, GPS data, manually entered data and PDA data.

The shipper or the carrier may have a capacity request in the form of a spot capacity input as shown in the Spot Capacity Input Table set forth above. Although typically the system operates with full truck loads, if less than full truck loads LTL are employed, the less than full truck load LTL Entry Table identified above is also a capacity request. In some situations, a shipper may want to use a less than full truck load transport order. In other situations, the carrier may have excess capacity in partially full trucks. The less than full truck loads LTL Entry Table represents such capacity request.

The results database 16 retains a record for each transport order or shipment. The Shipment Status Table set forth above lists common information for that shipment status. When a transport order or shipment is entered in the system, the system searches the database, finds shipping assets or capacities compatible with that transport order or nearly compatible with the transport order and sorts those elements primarily based on price or based on key performance indicators (KPI). The first step is the posting or listing of shipping assets which includes typically a driver-tractor-trailer combination. One of the parties, either the carrier or the shipper, is in contact with the other and the carrier has been tendered/offered the task, the shipment record is pre-booked. When a carrier agrees to accept the shipment (typically via electronic communications), the system classifies the shipment record as booked. The Booking Table set forth above is used by a carrier and/or a shipper. The Booked Shipment Table set forth above shows shipping assets that are particularly dedicated to and assigned loads or transport orders. Spot capacity is also utilized. The Spot Capacity Created Table above is identified as an output of database 16.

The results database 16 also tracks the load or goods in transit subject to the shipment record. The carrier as well as the shipper may request records from the results or shipment database 16. The Carrier Tracking Table set forth above provides an example of this type of inquiry and output. Since the shipment record may include GPS data, the GPS Device Log Table set forth above identifies some critical data which may be tracked in the shipment record. The shipment record also includes tracking shipment notes logs. These note logs can be entered by the administrator of the system and may also be entered under certain circumstances by the carrier and/or the shipper via web based input and/or the driver via a PDA. Since the results database 16 monitors the person who enters the note in the log (time, data, user name), this enables all parties who are handling or interested in that particular load transit to follow the shipment record. The Shipment Event History Table identified above shows common information relative to the entire history of the shipment in transit or the shipment record. As noted in FIG. 1, the carrier, shipper, and government agency and/or customer having an interest in the goods is able to see all or part of the shipment. Controls and passwords are used to ensure business confidentiality and privacy. Ultimately, reports can be generated by results database 16. The Advance Reports Table discussed above and the Action Item Table is employed as a communications and reporting tool. The Action Item Table is tied to the action report codes and these action report codes are generated in email messages to the carrier, shipper and/or administrators of the system. As used herein, the term "administrator of the system" refers to many people handling the shipment and having reasonable access to the results database 16.

Figure 2:
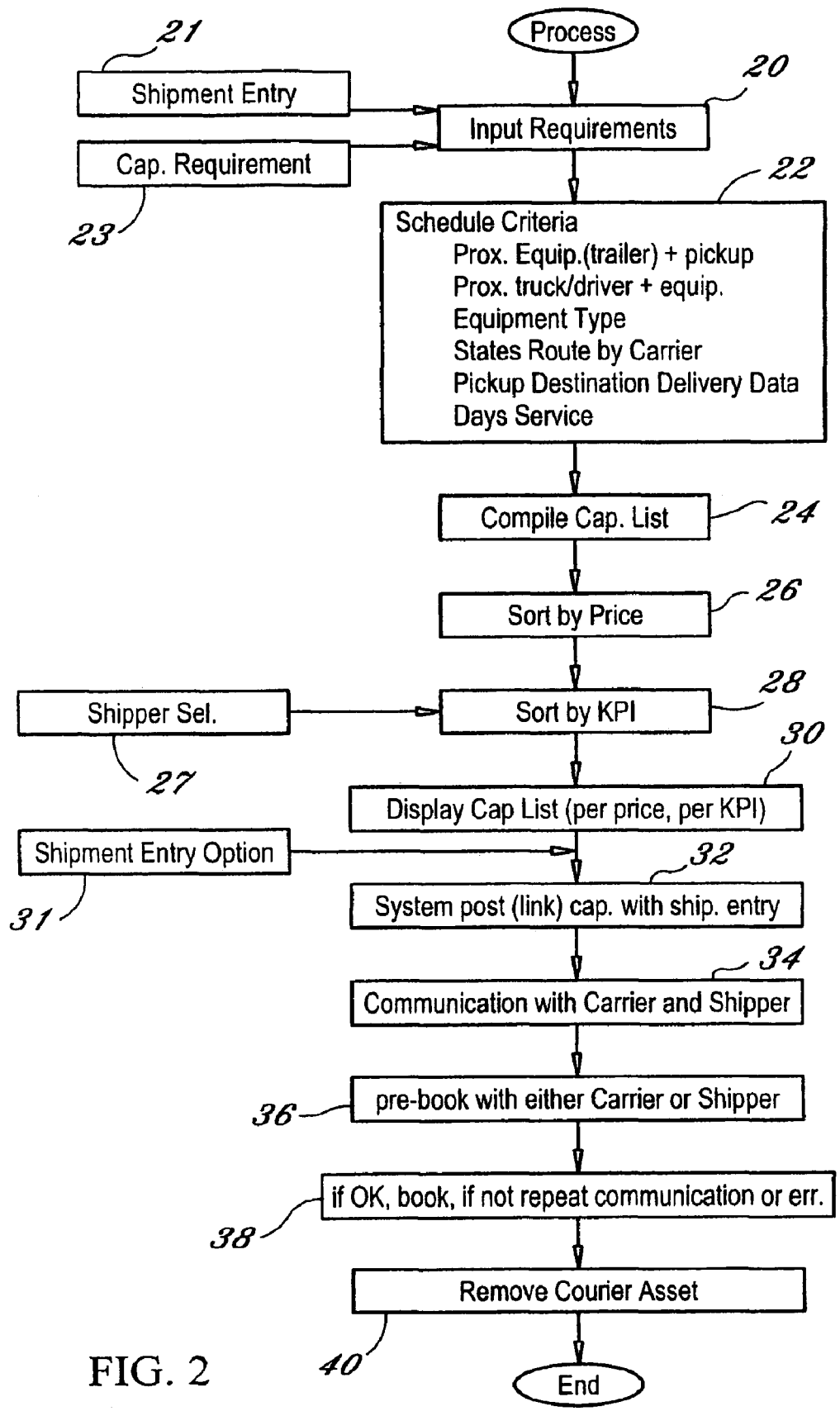
FIG. 2 diagrammatically illustrates one embodiment of a process routine or program subject to the dynamic and predictive information system and method herein.

FIG. 2 diagrammatically shows one process and the step 20 notes that an input request has been received by the information processing system. This input request may be a shipment entry 21 or may be a capacity request 23. Step 22 searches the databases, such as the carrier database 12 or the shipper database 14 or the results database 16, and searches through the records in order to determine a number of shipping assets and capacity available for a particular transport order. The search criteria is set forth and discussed above and may include proximity to the equipment or trailer and the pick up point for the goods in relation to the destination point of the goods subject to transport. The search criteria uses a proximal location engine to search the type of equipment or trailer necessary to carry the goods subject to a specific transport order. Of course, the states serviced by a particular carrier must be included as part of the search criteria. The pick up and destination delivery data such as day for the delivery, day of the pickup is used. The drivers' days of service also are important for qualifying carriers shipping assets for selection. Step 24 compiles a capacity list showing proposed or available capacity. Step 26 sorts the list of carriers by price. Step 28 may accept a shipper selection input 27 and may sort the list of available capacity and carrier by key performance index. The Key Performance Indicator Table set forth above explains this reorganization by the process in FIG. 2 of results database 16 output.

Step 30 displays the capacity list generated either per price or per KPI. Input step 31 notes that a shipper may input a shipment entry at that location in the flowchart. The initial request if it represented a capacity request 23 would look generally for capacity for shipping assets in the system. It should be noted that the search request screens for the system are highly flexible. For example, the Capacity Report Table may be activated based by state, by zip code, by a range or miles around a particular zip code, by equipment type (refrigerator truck, 45 foot truck, 53 foot truck, etc.) and the search may be activated by selecting the search key as noted above in the Capacity Report Table. The Available Shipments Table discussed above operates in the similar way. The user, whether a carrier or a shipper on a client computer, would select a pickup state, a delivery state, select one or more or all types of equipment (trailers) and the select search. The results database 16 would search through carrier database 12 and generate the available shipments table showing entries of carriers, stops, pickup date, pickup, delivery date, delivery, weight and equipment. In step 32, the system posts or links a particular capacity for a particular carrier with a particular shipment entry or transport order. Step 34 engages some type of communications, generally an electronic communications, between the selected carrier and the shipper seeking to utilize that capacity. Step 36 pre-books the shipping asset or capacity with the shipment order when the carrier has accepted the transport order. Step 38 recognizes that the specific carrier and the shipper submitting the transport order must agree. If not, the communications routine is again activated or an error code is generated for the system operator or system administrator. In step 40, after the shipper and carrier have accepted the transport order, the shipment record in "booked" and the carrier shipping asset is removed such that the system cannot reassign that shipping asset for the period of time subject to the transport order.

Figure 3:
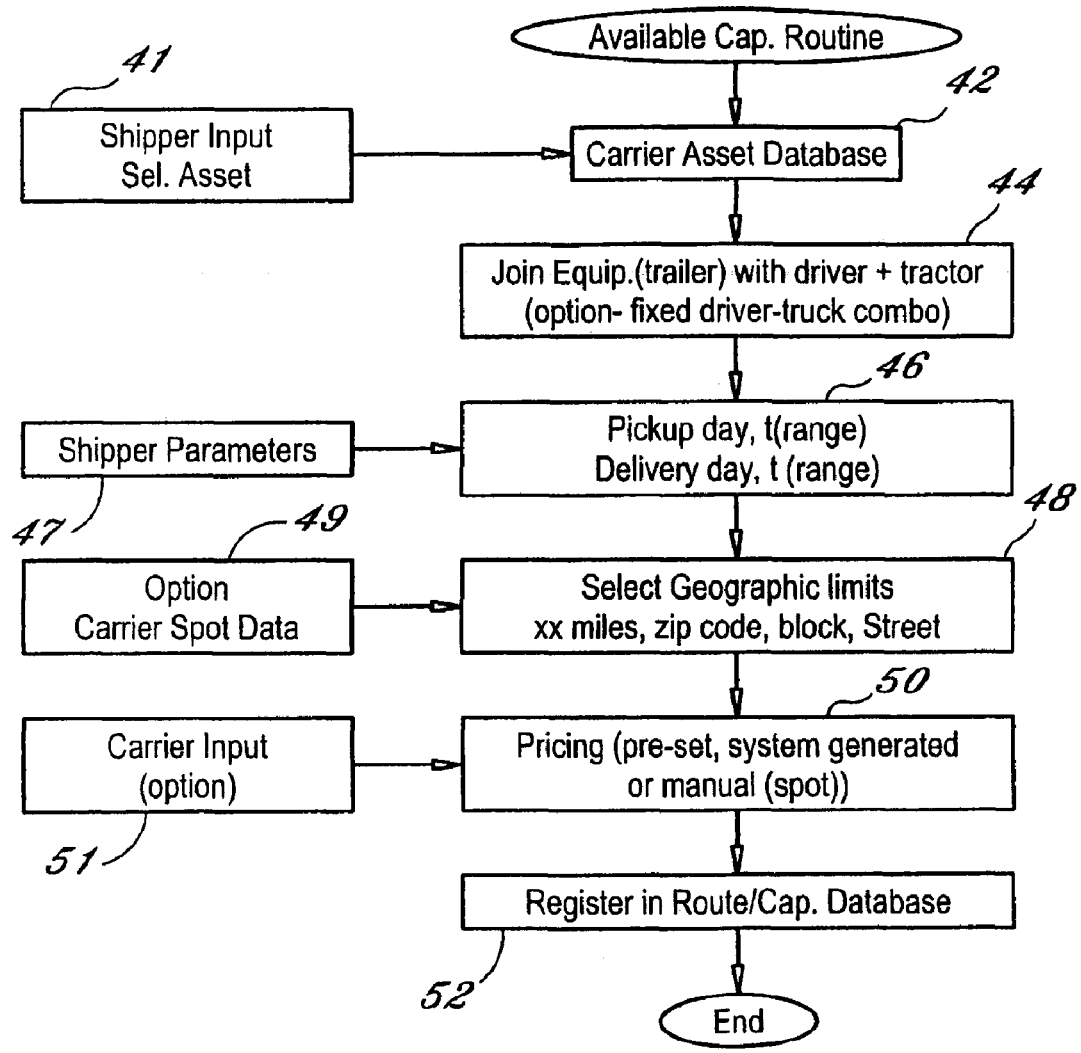
FIG. 3 diagrammatically illustrates the available capacity routine.

FIG. 3 diagrammatically shows the available capacity routine. Step 42 accesses the carrier asset database 12. Input step 41 recognizes that the shipper has input a "select asset" data request into the system. Step 44 electronically and automatically (without human interaction) joins equipment such as a trailer with a driver and tractor. This is the three-way combination discussed earlier. Optionally, the driver and trailer may be permanently fixed or associated with each other such that whenever a certain shipping asset is selected (a trailer) a particular designated driver follows that driver. Step 46 accepts input from the shipper as to the details of the transport request as noted by input step 47. Input step 47 has the shipper input transport parameters such as the pickup day, pickup time or range, delivery day and time or range. Step 48 accepts input from step 49 wherein the carrier inputs spot capacity data. Spot capacity data is typically a truck potentially sitting empty at a certain, non-standard location. Locations in the present system are identified by zip codes and an algorithm is utilized to locate the proximal zip codes about a target zip code. Spot capacity typically represents a shipping asset in a non-normal position. In step 48, the system typically identifies geographic limits for the shipping asset or available capacity. However, the carrier can override or reset those geographic limits as necessary. These geographic limits can be set in miles such as radius miles from a particular zip code or a particular zip code block or may be a state or city or other regional basis. Step 50 accepts input 51, carrier price override, which is optional by the carrier. In any event, step 50 identifies pricing for the particular shipment route. This pricing may be preset per mile or may be system generated or may be manually input. Pricing algorithms are discussed above. For example, in a spot capacity, the carrier may wish to charge a reduced amount of money, therefore may manually enter the spot price for that unused shipping asset. In other situations, the carrier may input standard pricing to ship goods throughout a particular state. Step 52 registers this information into the carrier database 12 and particularly in the route or capacity database. As explained earlier, a singular database may be utilized rather than multiple databases as discussed herein. The efficiency of the information processing system and the method may be improved or altered by the system designer with many databases, a single database or many indices.

Figure 4:
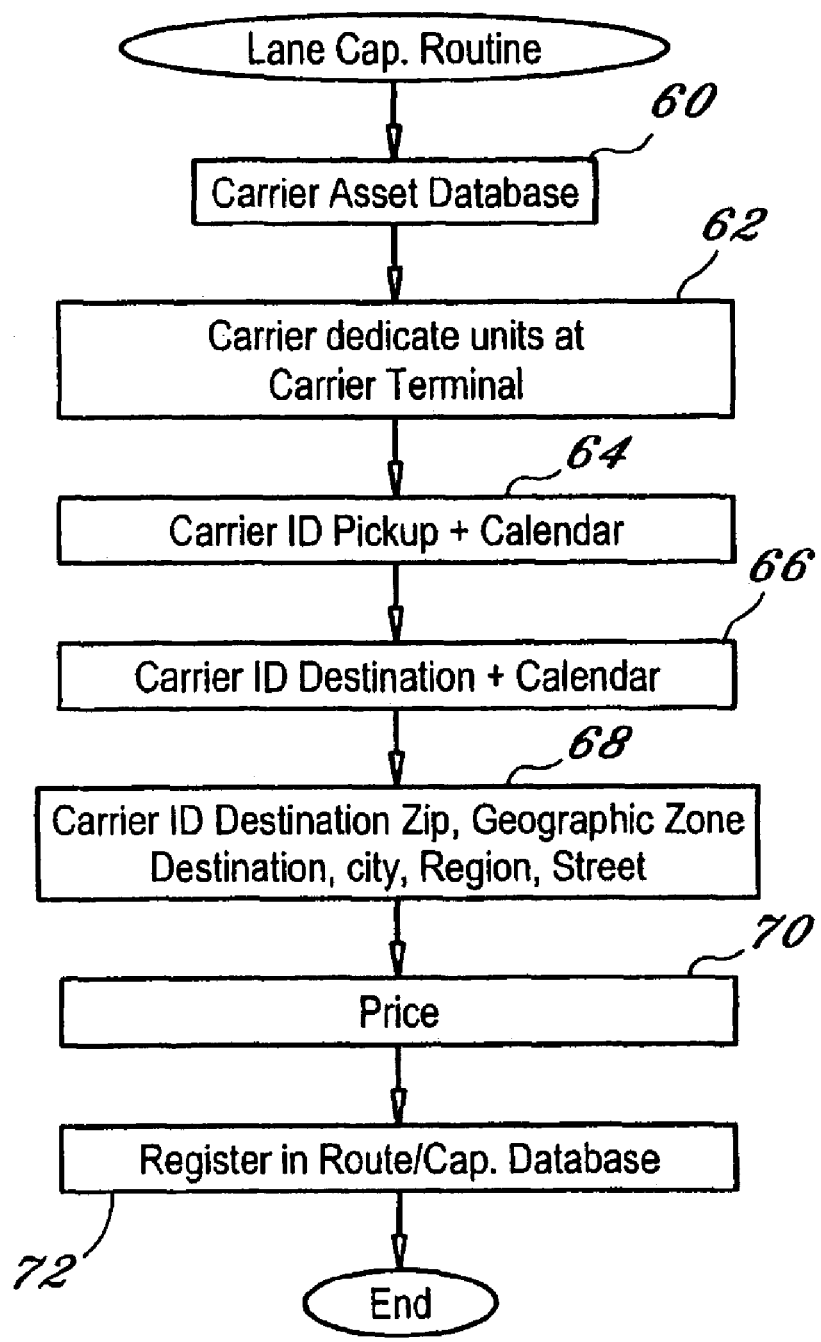
FIG. 4 diagrammatically illustrates the lane capacity routine.

FIG. 4 shows a lane capacity routine. In step 60, the carrier accesses the shipping asset database 12. Step 62 recognizes that the carrier dedicates certain units (shipping assets) at a carrier terminal to a shipping lane. A shipping lane is recognized as an often traveled or a particularly desired route between cities or between zip codes or between states. These shipping lanes are assigned pricing models such as a price per mile or a flat rate. Pricing models are discussed above. The origination is the carrier terminal or a particular carrier terminal out of many carrier terminals or user-defined origin. The destination may be a zip code, a mileage range about a certain destination zip code or may be a state. In the present invention, the carrier will provide shipping assets for a lane under the most common operation conditions. If the carrier cannot provide a shipping asset necessary to fill a transport order for a pre-set lane, there may be adverse economic consequences for the carrier reflected in KPI or handling charges. Step 64 permits the carrier to input a pickup data parameters such as location, days of operation and time and this data is calendared. Step 66 identifies the destination and calendar days as part of the lane. Step 68 identifies the destination zip code, the geographic zone about the destination, city region or state. Step 70 recognizes that the carrier must assign a pricing schedule or model to the lane or series of lanes. Step 72 registers the lane capacity in the route capacity database as part of the carrier database 12. Typically, the utilization of lane capacity employs a specific driver and a specific tractor but a non specific trailer. In other words, drivers are identified by identification numbers and tractors are identified by identification numbers and trailers are identified by identification numbers. In the pre-booked operation of the lane capacity, a non specific trailer is assigned since it is assumed that the carrier will make such equipment, such as trailer, available. The presence of a driver and a tractor is a specific asset that usually is assigned to a lane once a shipper pre-books certain shipping assets in a shipping lane.

Figure 5:
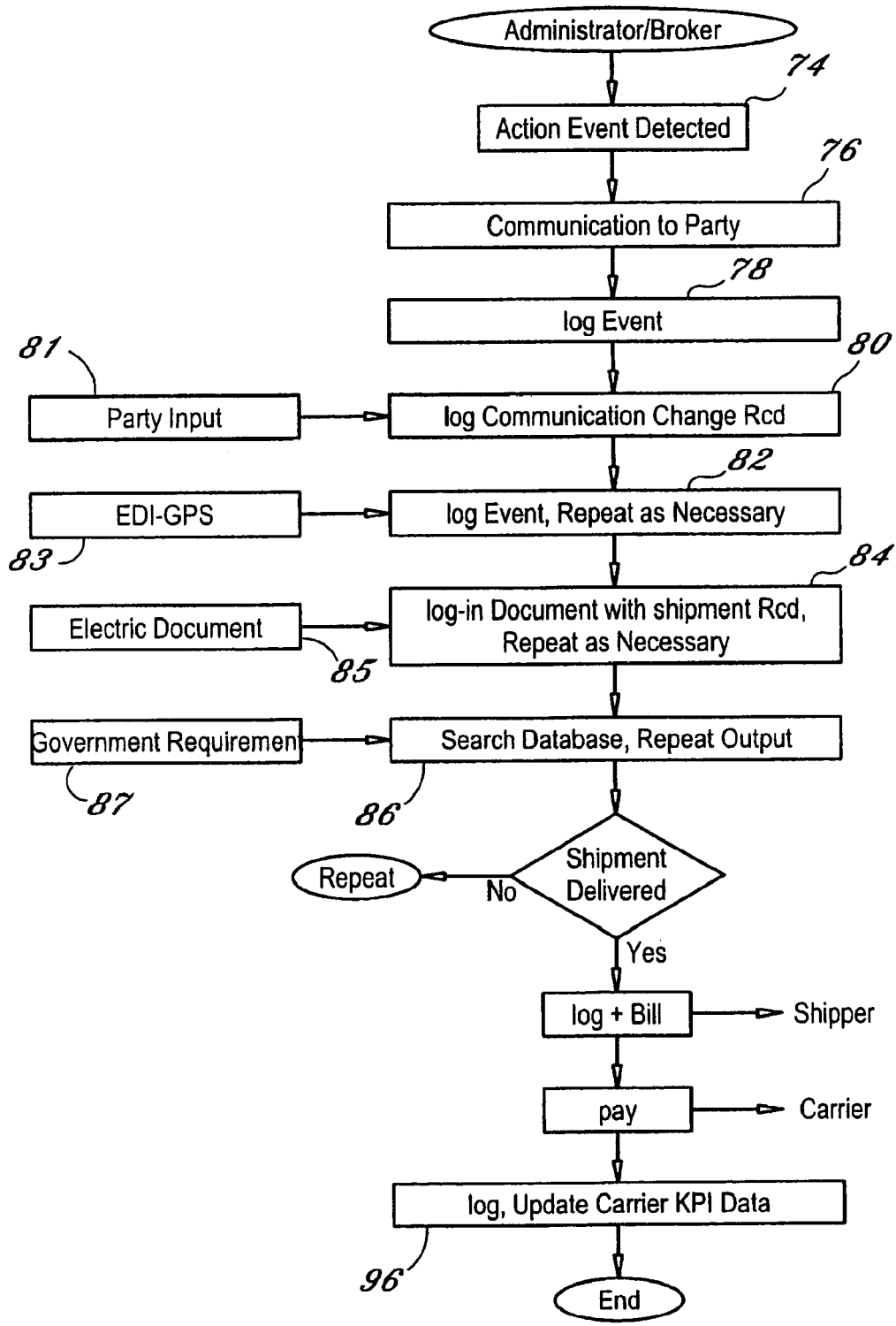
FIG. 5 diagrammatically illustrates an example of an administration and broker routine.

FIG. 5 shows the administration or broker routine. Brokers assist in the completion of a transport order. Step 74 recognizes that a certain action event as been detected. The action items listed in the table above show certain action events that cause communications messages sent to the administrator as compared to the shipper and the carrier. For example, a carrier change or CC action is electronically communicated to the shipper whereas a new load NL action is electronically sent to the carrier. The unavailable driver UD action results in electronic notification going to the shipper, carrier as well as the administrator. Step 76 recognizes that these action codes are communicated to a particular party such as certain personnel in the system administration, the carrier or the shipper. Step 78 logs the event into the shipment record in the results database 16. Step 80 logs in any communication by any party and changes the record notes. Input step 81 notes that a particular party such as a person who is part of the system administration, a carrier or shipper may input that information. Step 82 logs the event and generates a report as necessary. EDI and GPS electronic information is input in step 33 and is automatically logged into and applied to the shipment record in results database 16. When the driver utilizes a PDA, electronic documentation information in input step 85 is applied and in step 84 the system logs in this electronic data and lists that data as part of the shipment record. This data may include a PDF file with signatures showing the acceptance of the goods subject to the transport order, the delivery of the goods and signatures of the warehouseman and the driver. Input step 87 recognizes that a government agency or other type of regulatory body as requested an input into the system and search step 86 searches the carrier database 12, the shipper data base 14 and/or the results or shipment database 16. Reports are outputted as necessary from steps 82, 84 and 86. Decision step 90 determines whether a shipment is delivered. If not, the system simply repeats and continues to gather the information and generate action reports as necessary. If the shipment has been delivered, step 92 logs the delivery event and sends a communication to the shipper. Particularly, the system will bill the shipper. Step 94 is a payment step indicating that the carrier is paid. Preferably, carriers are paid within 24 hours of the delivery. This increases the participation of the carrier into the electronic capacity allocation system. Step 96 logs the payment into the shipment database and updates the carrier's performance history. This history is used to grade and sort carriers' available capacity as discussed above. See discussion of key criteria for searching the database above.

Figure 6:
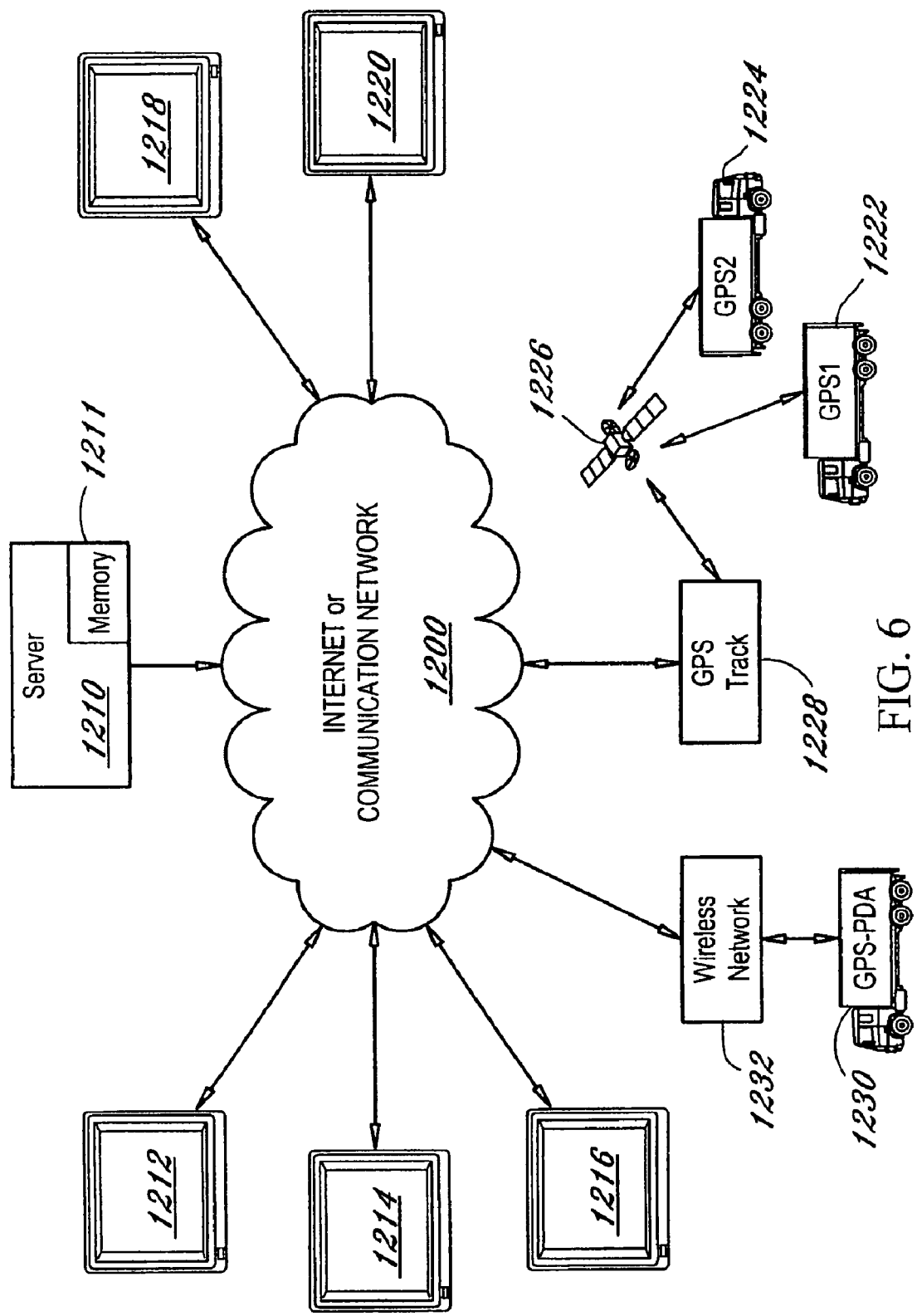
FIG. 6 diagrammatically illustrates an example of a distributed computer system or one implementation of a system for the information processing method herein.

FIG. 6 diagrammatically illustrates one example of the distributed computer system within which the information processing system and method discussed herein can be employed. The diagram also shows one embodiment of an overall communications system to link the computer hardware system for the present invention. Internet or other communications network 1200 links a server computer 1210 having memory 1211 to the Internet. Databases 12, 14, 16 reside on server 1210 (which may be multiple servers). Further, shippers 1 and 2 use client computers 1212 and 1214. Government or other agencies use client computer 1216. Carriers 1 and 2 use client computers 1218, 1220. Client computers 1212-1220 communicate with server 1210 (operated and maintained by the system administrator) via Internet or communications network 1200 to download information, request information regarding capacity, shipments, etc. The use of web-based input and output protocol and structure makes the computer program system independent of hardware demands. GPS units 1 and 2 are mounted in or on trucks/trailers/tractors/loads 1222 and 1224 and the GPS systems communicate with GPS satellite 1226 (representing multiple satellites and communications systems) and with GPS tracker system 1228. GPS tracker system 1228 is coupled to the Internet or communications network 1200 and information relative to the location of shipping assets 1222, 1224 is uploaded into the server 1210 maintaining the information system described earlier herein. The GPS on the trailer may include temperature sensors, data acquisition detectors and other sensors. This data may be sent with the GPS location data to the server. Further, shipping asset 1230 has a GPS unit linked to a personal electronic device or PDA. The GPS unit communicates with GPS tracker and the PDA communicates with wireless network 1232. Data from the PDA, which may include GPS data, is sent via wireless network 1232 to server 1210 via communications network 1200. The GPS data and load sensing data may be communicated independently with respect to the PDA electronic document data. It should be noted that communications network 1200 may be a wireless network using cellular communications rather than the Internet which is considered a "wired" network. The means of communications is not critical to portions of the present invention however the fact that some communications occurs between server 1210, GPS units, GPS-PDA units and various shipper and carrier client computers is important. The communications channels can change but the act of communicating is important.

Figure 7:
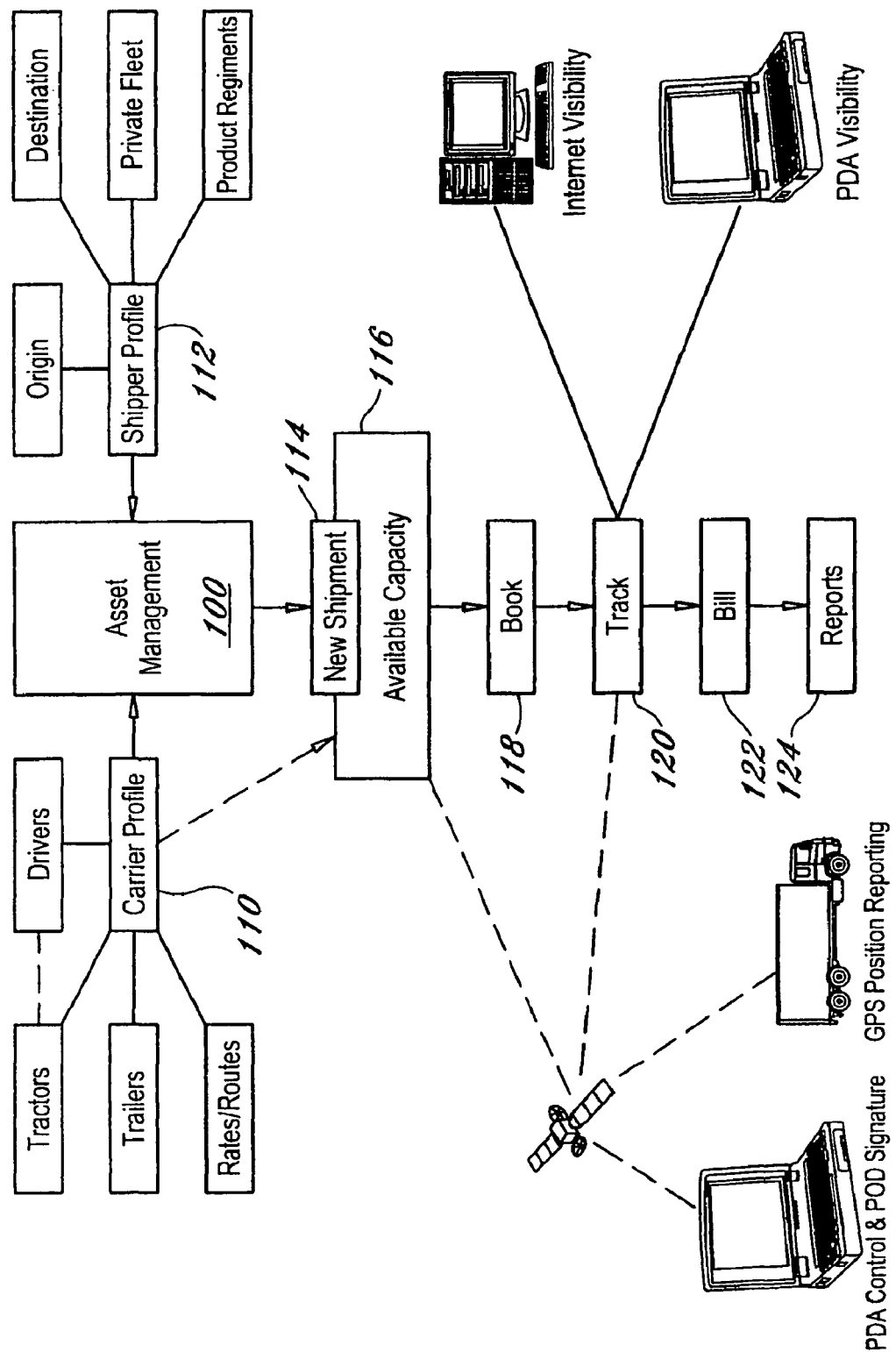
FIG. 7 diagrammatically illustrates a system diagram and a major flowchart therefor; and, FIGS. 8A, 8B and 8C diagrammatically illustrate a data flow chart for one embodiment of the system and method.

FIG. 7 shows a large system diagram for the present invention. Carrier profile 110 includes information from drivers, tractors, trailers or equipment, rates and routes. Some drivers are permanently linked to tractors as described above. In such situations, when a driver or a trailer of a particular type is assigned to a shipment record in a posting sense, prior to pre-booking and booking, the driver is always permanently associated with the trailer. This information is applied into the asset management database 100. From the shipper's side, the shipper profile 112 includes origin data such as the location of goods subject to a particular transport order, destination data, that is, where the goods should be delivered, as well as private fleet and other product requirements. Product requirement simply is a particular type of equipment or trailer necessary for certain loads such as a refrigerator trailer. The system is flexible enough such that certain shippers may schedule their private fleets or privately owned shipping assets. These shippers, in this situation, act as carrier and input information in the same manner discussed above and utilize the system as a scheduling and routing program. The shippers submit a new shipment or transit order 114 into the system. The information processing system then conducts a search and a sort routine to generate available capacity as shown in function block 116. The carrier may supply spot capacity information into functional available capacity block 116. Further, satellites obtain in GPS data from trucks and/or GPS data from PDAs (the GPS data, being mechanically coupled to the PDA, is also fed into the available capacity function 116). The output from available capacity function 116 is a booking function 118 wherein a particular shipper has agreed to utilize a particular carrier and contract for shipping assets from a particular carrier. Step 120 recognizes that a tracking function is provided by the system via the satellite and GPS and PDA inputs. The output from tracking function provides complete visibility electronically to the carrier owning and operating the shipping asset as well as the shipper having the shipment request. Further, government agencies may be interested in reviewing the shipment data. Additionally, the driver is provided with this tracking information via the PDA. Function step 122 indicates that various parties are billed and function step 124 generates reports to the shipper, the carrier, the government and the system operator as necessary.

Figure 8A:
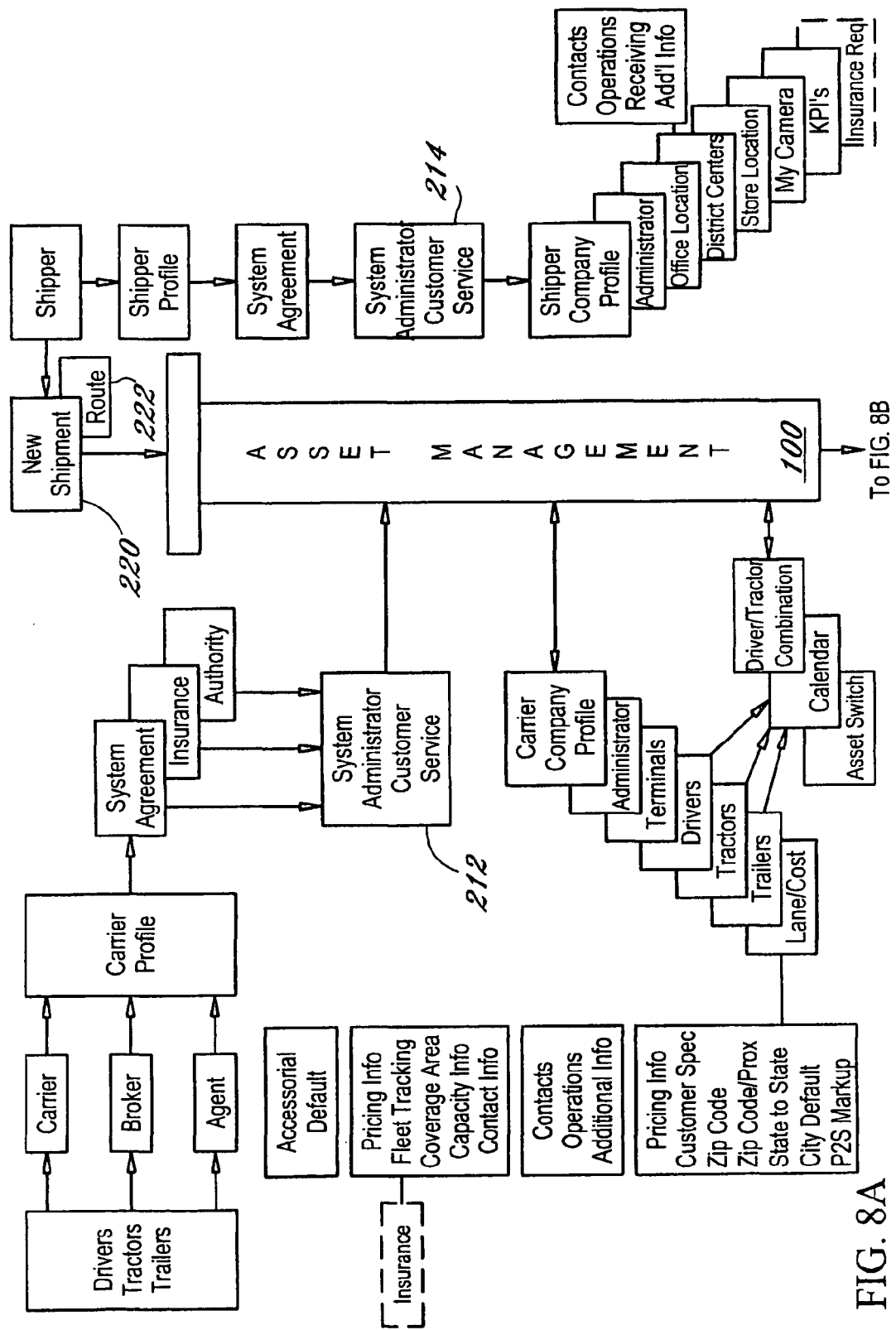
Figure 8B:
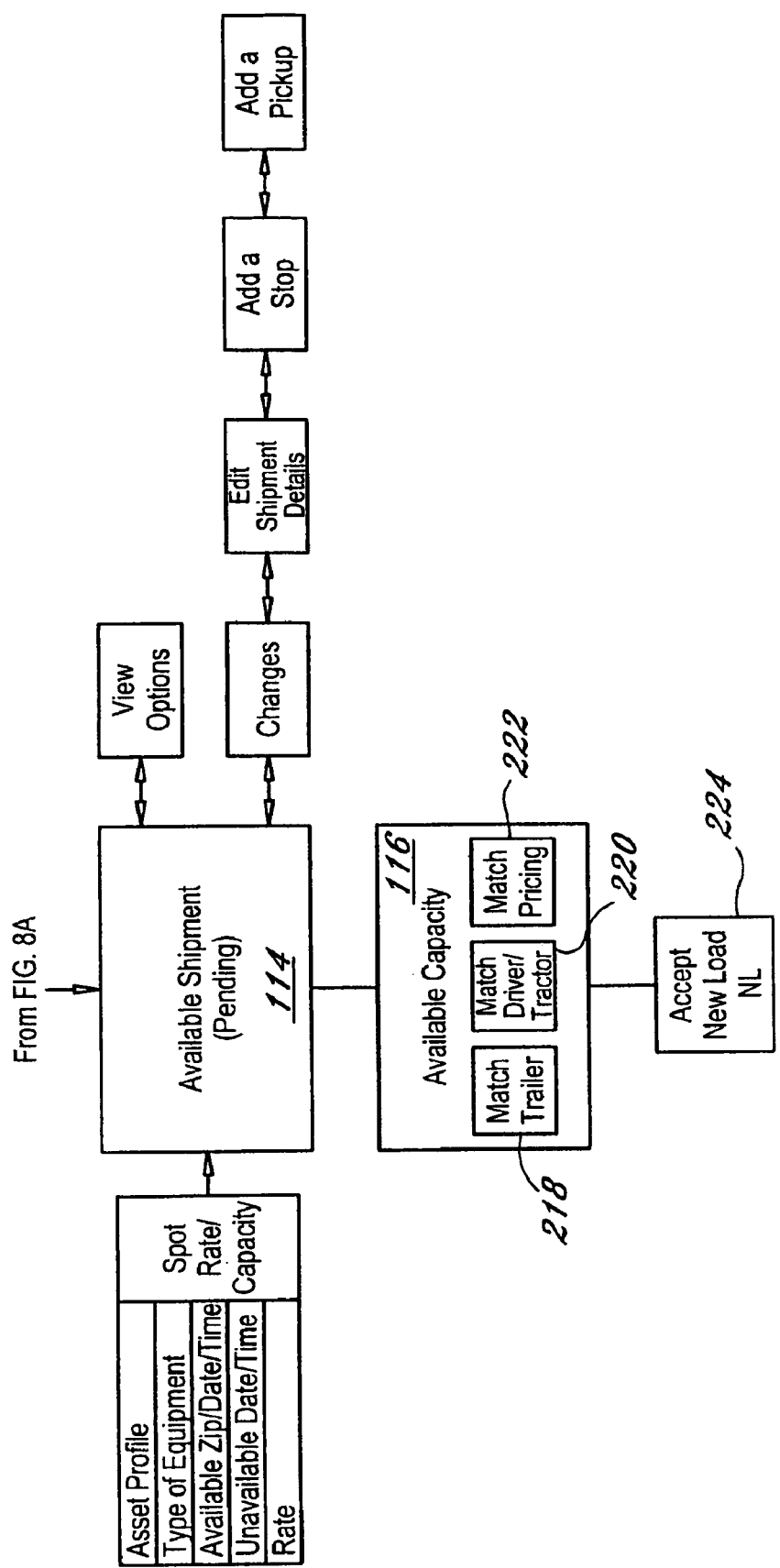
Figure 8C:
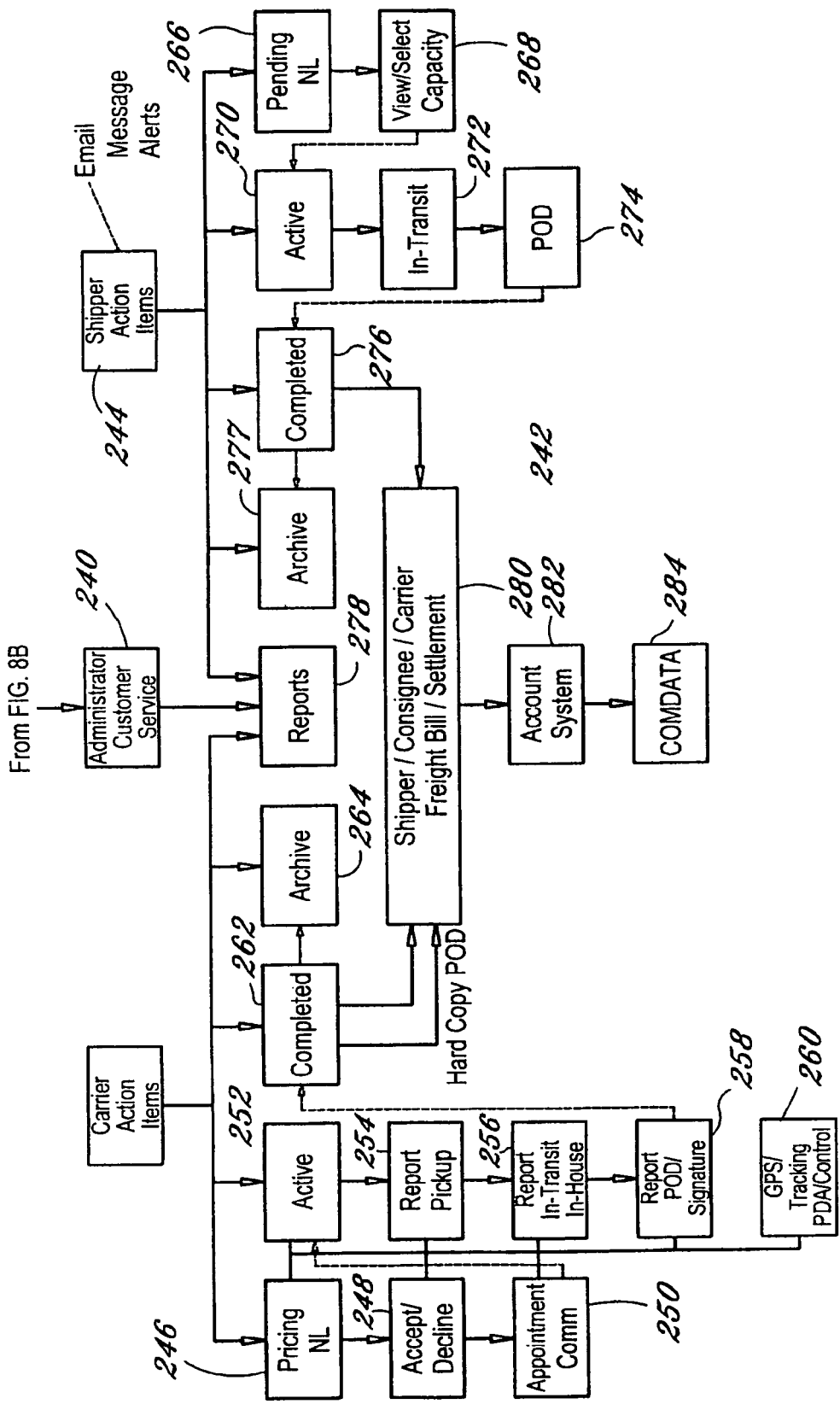

FIGS. 8A, 8B and 8C are larger system diagrams showing data flow for one embodiment of the present invention.

FIG. 8A shows on the left hand side additional information for the carrier. The carrier may be defined by a carrier profile which lists contact data for the carrier and shipping broker data and agent data. Further, the carrier signs, in the illustrated embodiment, a contract with the system operator or administrator of the asset management program 100 such that the price of any shipment handled by the asset manager system is increased by an incremental configurable amount (currently 8% to 10%) to cover the cost of the system and generate a profit. The carrier also provides accessorial data and information and pricing information and insurance information as well as particular details regarding equipment and trailers and terminals where the shipping assets are located as well as the contact administrators for the terminals. On the right hand side of FIG. 8A, the shipper information includes shipper profile and the shipper signs an agreement with the system administrator. The system administrator provides administrative support as shown in function block 212 (carrier side) and function block 214 (shipper side). The shipper company profile includes shipper contact administrator, office location, distribution centers, store locations, personal fleet data subject to the shipping asset allocation as well as insurance. KPI inputs are also noted in FIG. 8A. A shipper inputs a new shipment record 220 (top of FIG. 8A) and also includes some route information as function block 222.

FIG. 8B is a flowchart running from asset management function block 100 to available shipment or posting function 114. On the left side, a shipping asset profile is built including type of equipment, available geographic data such as by zip code, data and time and unavailable date and time information, rate information. Additionally, spot rate capacity may be input into the system. On the right hand side, displays are shown to the carrier and the shipper as per interest level and security level. Changes are noted, the system administrator and the carrier and the shipper are permitted to edit certain details, such as to add stops and add a pickup detail. Function block 116 represents the available capacity routine. This routine is accessible by either the carrier or the shipper. Functional element 218 first matches a trailer to the new shipment entry 220, and function block 120 matches a driver to a tractor. Pricing is matched to the transport order in function block 222. Function block 224 represents an electronic communication between an interested carrier and an interested shipper wherein the carrier and the shipper accept a new load, NL action code.

Leading to FIG. 8C, the administrator solves any open issues with respect to the matching of the transport order and the shipping asset allocation in function block 240 and communicates via carrier action items in function block 242 and shipper action items in function block 244. Email messages and alerts and instant messaging services may be employed. On the carrier side, function block 246 is a new load NL pending, function block 248 either enables the carrier to accept or decline the commitment of shipping assets and function block 250 confirms the appointment. These lead to archive function block 252, report pickup 254, report in transit, in house function 256 and report POD and signature function block 258. GPS tracking and PDA control data in function block 260 is integrated with functions 246, 248, 250, 252, 254, 256 and 258. Completed function block 262 leads to archive function block 264. A hard copy is applied to shippers/consignee/carrier freight bill/settlement function block 280. The freight bill settlement function block 280 leads to accounting function block 282 and ultimately to electronic communications data function block 284.

On the shipper side, pending new load NL function block 266 is subject to display in the view/select capacity function block 268. This leads to active function block 270 wherein the item is posted and pre-booked. Function block 272 represents that the load is in transit and function block 274 is POD. Function block 276 indicates completion of delivery and function block 277 is an archive step. Reports 278 are available from both the carrier and the action side.

The claims appended hereto are meant to cover modifications and changes within the scope and spirit of the present invention.

What is claimed is:

1. A method for electronically assigning shipping assets to goods subject to transport orders in a computer system, said shipping assets including a plurality of drivers, tractors and trailers from a plurality of carriers and said goods subject to a plurality of said transport orders from a plurality of shippers, comprising:

maintaining a database in said computer system with data representing respective shipping assets associated with corresponding carriers some of which are lane route carriers, each lane carrier having at least one terminal from which respective shipping assets originate and route lanes between a corresponding lane carrier terminal and a corresponding termination location and a respective pricing schedule;

said computer system electronically accepting a specific transport order for goods from one shipper, said specific transport order having ship from origin and a ship to destination geographically proximal to respective terminals and termination locations for a sub-plurality of carriers;

said computer system electronically joining, for said specific transport order and for each carrier of said sub-plurality of carriers, a respective combination of a driver, a tractor and a trailer able to transport said goods;

said computer system electronically selecting, sorting and displaying by price, carriers within said sub-plurality of carriers based upon a plurality of search criteria including close proximity of corresponding terminals and termination locations to ship origin and ship destination, and pick-up and delivery constraints;

in conjunction with an electronic communication with one of the selected carriers and said one shipper, said computer system booking and electronically logging said one selected carrier and the associated joined driver-tractor-trailer combination to fill said transport order for said goods.

2. A method for electronically assigning shipping assets as claimed in claim 1 wherein said carriers are commercially independent of each other.

3. A method for electronically assigning shipping assets as claimed in claim 1 wherein a further sub-plurality of drivers are permanently assigned to a respective further sub-plurality of tractors, which are designated as permanently joined driver-tractor combinations, and wherein electronically selecting said sub-plurality of carriers includes a search for the close proximity permanently joined driver-tractor combinations to said ship origin.

4. A method for electronically assigning shipping assets as claimed in claim 1 wherein electronically joining occurs automatically without user intervention.

5. A method for electronically assigning shipping assets as claimed in claim 1 wherein said electronic communication includes email notification or instant messaging service notification.

6. A method for electronically assigning shipping assets as claimed in claim 1 wherein said selecting, sorting and display results in a posting of specific shipping assets for respective carriers and the method includes multiple postings for the same specific shipping asset.

7. A method for electronically assigning shipping assets as claimed in claim 1 wherein electronically joining joins a specific driver and a specific tractor but joins a non-specific trailer for said sub-plurality of carriers.

8. A method for electronically assigning shipping assets as claimed in claim 2 wherein a further sub-plurality of drivers are permanently assigned to a respective further sub-plurality of tractors, which are designated as permanently joined driver-tractor combinations, and wherein electronically selecting said sub-plurality of carriers includes a search for the close proximity permanently joined driver-tractor combinations to said ship origin.

9. A method for electronically assigning shipping assets as claimed in claim 8 wherein electronically joining occurs automatically without user intervention.

10. A method for electronically assigning shipping assets as claimed in claim 9 wherein said electronically selecting, sorting and displaying includes a user activated sort by historic performance rating which includes one or both of historic on-time delivery data and adverse delivery event data.

11. A method for electronically assigning shipping assets as claimed in claim 10 wherein said electronic communication includes email notification or instant messaging service notification.

12. A method for electronically assigning shipping assets as claimed in claim 11 wherein said selecting, sorting and display results in a posting of specific shipping assets for respective carriers and the method includes multiple postings for the same specific shipping asset.

13. A method for electronically assigning shipping assets as claimed in claim 12 wherein electronically joining joins a specific driver and a specific tractor but joins a non-specific trailer for said sub-plurality of carriers.

14. A method for electronically assigning shipping assets as claimed in claim 10 wherein said electronically selecting, sorting and displaying includes a user activated sort by historic performance rating which includes one or both of historic on-time delivery data and adverse delivery event data.

15. A method for electronically assigning shipping assets to goods subject to transport orders in a computer system, said shipping assets including a plurality of drivers, tractors and trailers from a plurality of carriers and said goods subject to a plurality of said transport orders from a plurality of shippers, some drivers and tractors and trailers having global positioning units which locate said tractor and trailer shipping assets and personal data assistants which electronically display and capture electronic shipping documents and data relative to said electronic shipping documents, the method comprising:

maintaining a database in said computer system with data representing respective shipping assets associated with corresponding carriers, and data relative to each carrier having at least one terminal from which respective shipping assets originate and transport service areas and a respective pricing schedule, and data from global positioning units of drivers and tractors and trailers and data from personal data assistants which electronically document said electronic shipping documents;

said computer system electronically accepting a specific transport order for goods from one shipper, said specific transport order having ship from origin and a ship to destination geographically proximal to respective service areas for a sub-plurality of carriers;

said computer system electronically joining, for said specific transport order and for each carrier of said sub-plurality of carriers, a respective combination of a driver, a tractor and a trailer able to transport said goods;

said computer system electronically selecting, sorting and displaying by price, carriers within said sub-plurality of carriers based upon proximity of corresponding terminals to ship origin and pick-up and delivery constraints;

in conjunction with an electronic communication with one of the selected and displayed carriers and said one shipper, said computer system booking and electronically logging said one selected carrier and the associated joined driver-tractor-trailer combination to fill said transport order for said goods; and said computer system electronically accepting data from the joined driver-tractor-trailer combination for the one selected carrier and corresponding global positioning unit and personal data assistant to electronically document transit of the fulfillment of said transport order for said goods.

16. A method for electronically assigning shipping assets as claimed in claim 15 wherein said carriers are commercially independent of each other.

17. A method for electronically assigning shipping assets as claimed in claim 15 wherein said global positioning unit is coupled to a respective personal data assistant and the coupled global positioning unit-personal data assistant is removably mounted in a respective tractor.

18. A method for electronically assigning shipping assets as claimed in claim 15 wherein electronically joining occurs automatically without user intervention.

19. A method for electronically assigning shipping assets as claimed in claim 15 wherein said electronically selecting, sorting and displaying includes a user activated sort by historic performance rating which includes one or both of historic on-time delivery data and adverse delivery event data.

20. A method for electronically assigning shipping assets as claimed in claim 15 wherein said electronic communication includes email notification or instant messaging service notification.

21. A method for electronically assigning shipping assets as claimed in claim 15 wherein said selecting, sorting and display results in a posting of specific shipping assets for respective carriers and the method includes multiple postings for the same specific shipping asset.

22. A method for electronically assigning shipping assets as claimed in claim 16 wherein said global positioning unit is coupled to a respective personal data assistant and the coupled global positioning unit-personal data assistant is removably mounted in a respective tractor.

23. A method for electronically assigning shipping assets as claimed in claim 22 wherein electronically joining occurs automatically without user intervention.

24. A method for electronically assigning shipping assets as claimed in claim 23 wherein said electronically selecting, sorting and displaying includes a user activated sort by historic performance rating which includes one or both of historic on-time delivery data and adverse delivery event data.

25. A method for electronically assigning shipping assets as claimed in claim 24 wherein said electronic communication includes email notification or instant messaging service notification.

26. A method for electronically assigning shipping assets as claimed in claim 25 wherein said selecting, sorting and display results in a posting of specific shipping assets for respective carriers and the method includes multiple postings for the same specific shipping asset.

27. An information processing system for electronically assigning shipping assets to goods subject to transport orders, said shipping assets including a plurality of drivers, tractors and trailers from a plurality of carriers and said goods subject to a plurality of said transport orders from a plurality of shippers, comprising:

a central computer linked, via a communications network, to a plurality of user computers, said corresponding user computers under the control of said respective carriers of said plurality of carriers and respective shippers of said plurality of shippers;

a database on said central computer with data representing respective shipping assets associated with corresponding carriers some of which are lane route carriers, each lane carrier having at least one terminal from which respective shipping assets originate and route lanes between a corresponding lane carrier terminal and a corresponding termination location and a respective pricing schedule, said database containing data representing respective terminals, route lanes and termination locations and pricing schedules for corresponding carriers;

means for electronically accepting a specific transport order for goods from a respective use computer for one shipper, said specific transport order having ship from origin and a ship to destination geographically proximal to respective terminals and termination locations for a sub-plurality of carriers;

at said central computer, a search engine for locating in said database and means for electronically joining, for said specific transport order and within said sub-plurality of carriers, a respective combination of a driver, a tractor and a trailer able to transport said goods subject to said transport order;

a further search engine at said central computer electronically selecting and sorting by price, carriers within said sub-plurality of carriers based upon close proximity of corresponding terminals and termination locations to ship origin and ship destination, and pick-up and delivery constraints;

means for displaying to said users via said central computer and user computers over said communications network the selected and sorted sub-plurality of carriers and respective pricing for respective carriers in said sub-plurality of carriers; and an electronic communications means, operable with a user computer for a selected carrier of said sub-plurality of carriers and a user computer for said one shipper with said specific transport order, for booking and electronically logging said one selected carrier and the associated joined driver-tractor-trailer combination to fill said transport order for said goods.

28. An information processing system for electronically assigning shipping assets as claimed in claim 27 wherein said carriers are commercially independent of each other.

29. An information processing system for electronically assigning shipping assets as claimed in claim 27 wherein said database includes data representing historic performance for said shippers including historic on-time delivery data and adverse delivery event data and said further search engine sorts carriers within said sub-plurality of carriers based upon one or the other or both said historic on-time delivery data and adverse delivery event data.

30. An information processing system for electronically assigning shipping assets as claimed in claim 27 wherein said electronic communication means includes an email system or an instant messaging system.

31. An information processing system for electronically assigning shipping assets as claimed in claim 28 wherein said database includes data representing historic performance for said shippers including historic on-time delivery data and adverse delivery event data and said further search engine sorts carriers within said sub-plurality of carriers based upon one or the other or both said historic on-time delivery data and adverse delivery event data.

32. An information processing system for electronically assigning shipping assets as claimed in claim 31 wherein said electronic communication means includes an email system or an instant messaging system.

33. An information processing system for electronically assigning shipping assets to goods subject to transport orders, said shipping assets including a plurality of drivers, tractors and trailers from a plurality of carriers and said goods subject to a plurality of said transport orders from a plurality of shippers, some drivers and tractors and trailers having global positioning units which locate said tractor and trailer shipping assets and personal data assistants which electronically display and capture electronic shipping documents and data relative to said electronic shipping documents, the system comprising:

- a central computer linked, via a communications network, to a plurality of user computers, said corresponding user computers under the control of said respective carriers of said plurality of carriers and respective shippers of said plurality of shippers;
- said central computer further linked, via a communications network, to the plurality of global positioning units and personal data assistants such that location data and electronic shipping document data is shared with said central computer and with said user computers;
- a database on said central computer with data representing respective shipping assets associated with corresponding carriers, and data relative to each carrier having at least one terminal from which respective shipping assets originate and transport service areas and a respective pricing schedule, and data from global positioning units of drivers and tractors and trailers and data from personal data assistants which electronically documents said electronic shipping documents;
- means for electronically accepting a specific transport order for goods from one shipper, said specific transport order having ship from origin and a ship to destination geographically proximal to respective service areas for a sub-plurality of carriers;
- at said central computer, a search engine for locating in said database and means for electronically joining, for said specific transport order and for carriers in said sub-plurality of carriers, a respective combination of a driver, a tractor and a trailer able to transport said goods;
- a further search engine at said central computer electronically selecting and sorting by price, carriers within said sub-plurality of carriers based upon close proximity of corresponding terminals and termination locations to ship origin and ship destination, and pick-up and delivery constraints;
- means for displaying to said users via said central computer and user computers over said communications network the selected and sorted sub-plurality of carriers and respective pricing for respective carriers in said sub-plurality of carriers; and
- an electronic communications means, operable with a user computer for a selected carrier of said sub-plurality of carriers and a user computer for said one shipper with said specific transport order, for booking and electronically logging said one selected carrier and the associated joined driver-tractor-trailer combination to fill said transport order for said goods; and
- means for electronically accepting data from the joined driver-tractor-trailer combination for the one selected carrier and corresponding global positioning unit and personal data assistant to electronically document transit of the fulfillment of said transport order for said goods.

34. An information processing system for electronically assigning shipping assets as claimed in claim 33 wherein said carriers are commercially independent of each other.

35. An information processing system for electronically assigning shipping assets as claimed in claim 33 wherein said global positioning unit is coupled to a respective personal data assistant and the coupled global positioning unit-personal data assistant is removably mounted in a respective tractor.

36. An information processing system for electronically assigning shipping assets as claimed in claim 33 wherein said database includes data representing historic performance for said shippers including historic on-time delivery data and adverse delivery event data and said further search engine sorts carriers within said sub-plurality of carriers based upon one or the other or both said historic on-time delivery data and adverse delivery event data.

37. An information processing system for electronically assigning shipping assets as claimed in claim 33 wherein said electronic communication means includes an email system or an instant messaging system.

* * * * *